(12) United States Patent
Sverdlov et al.

(10) Patent No.: US 12,107,789 B2
(45) Date of Patent: Oct. 1, 2024

(54) RS PATTERN ASSOCIATED WITH DYNAMIC SPUR DETECTION

(71) Applicant: QUALCOMM Incorporated, San Diego, CA (US)

(72) Inventors: Alexander Sverdlov, Rehovot (IL); Michael Levitsky, Rehovot (IL); Assaf Touboul, Netanya (IL); Gideon Shlomo Kutz, Ramat Hasharon (IL); Guy Wolf, Rosh Haayin (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 17/651,400

(22) Filed: Feb. 16, 2022

(65) Prior Publication Data

US 2023/0318766 A1  Oct. 5, 2023

(51) Int. Cl.
*H04L 5/00* (2006.01)
*H04W 72/23* (2023.01)

(52) U.S. Cl.
CPC .......... *H04L 5/0048* (2013.01); *H04W 72/23* (2023.01)

(58) Field of Classification Search
CPC ............................ H04L 5/0048; H04W 72/23
See application file for complete search history.

(56) References Cited

U.S. PATENT DOCUMENTS

2020/0153580 A1\* 5/2020 Hessler ................ H04L 1/0011

\* cited by examiner

*Primary Examiner* — Ronald B Abelson
(74) *Attorney, Agent, or Firm* — Procopio, Cory, Hargreaves & Savitch LLP

(57) ABSTRACT

A base station may configure a user equipment (UE) with a subset of reference signal (RS) configurations among a set of RS configurations, and transmit a plurality of RSs based on the subset of RS configurations. The RS may be a demodulation RS (DMRS). The plurality of RSs may be configured to span each of the plurality of resource elements (REs) in the active bandwidth part (BWP). The UE may receive the plurality of RSs based on the subset of RS configurations and perform a spur detection based on the plurality of RSs received based on the subset of RS configurations. Each RS configuration of the set of RS configurations may be associated with at least one of the subset of RS configurations that is associated with the plurality of RSs spanning each of the plurality of REs in the active BWP.

28 Claims, 12 Drawing Sheets

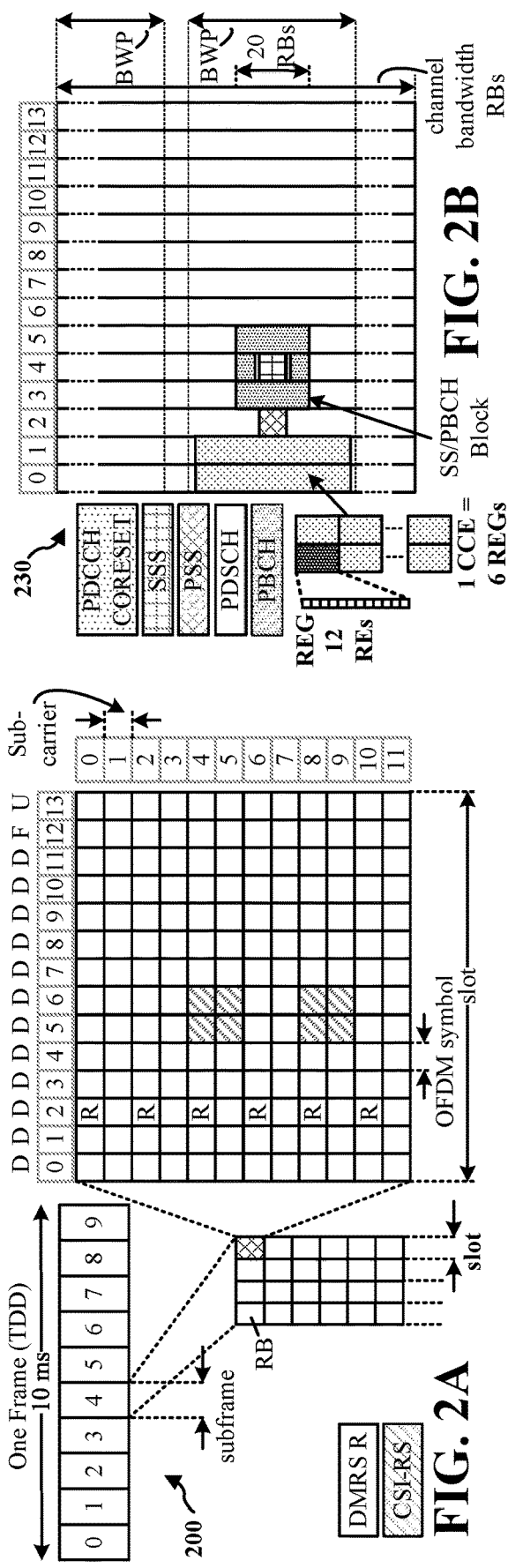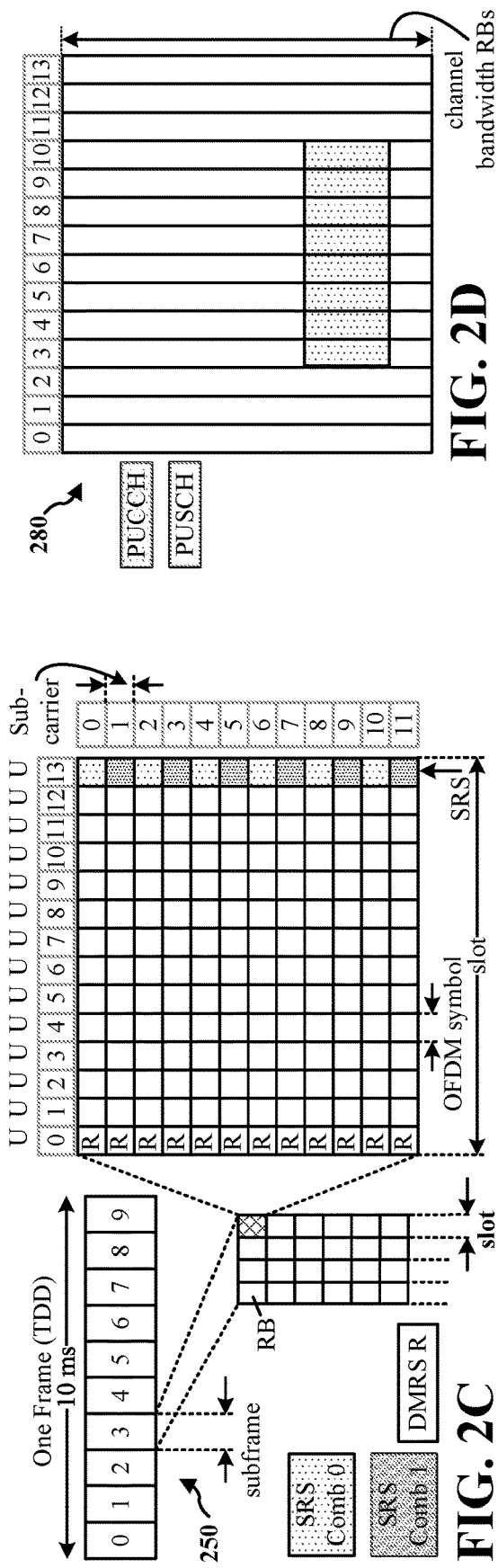

RS PATTERN ASSOCIATED WITH DYNAMIC SPUR DETECTION

TECHNICAL FIELD

The present disclosure relates generally to communication systems, and more particularly, to a method of wireless communication including a dynamic spur detection.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a base station and a user equipment (UE). The base station may configure the UE with a subset of reference signal (RS) configurations among a set of RS configurations, and transmit a plurality of RSs based on the subset of RS configurations. The RS may be a demodulation RS (DMRS). The plurality of RSs may be configured to span each of the plurality of resource elements (REs) in the active bandwidth part (BWP). The UE may receive the plurality of RSs based on the subset of RS configurations and perform a spur detection based on the plurality of RSs received based on the subset of RS configurations. Each RS configuration of the set of RS configurations may be associated with at least one of the subset of RS configurations that is associated with the plurality of RSs spanning each of the plurality of REs in the active BWP.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
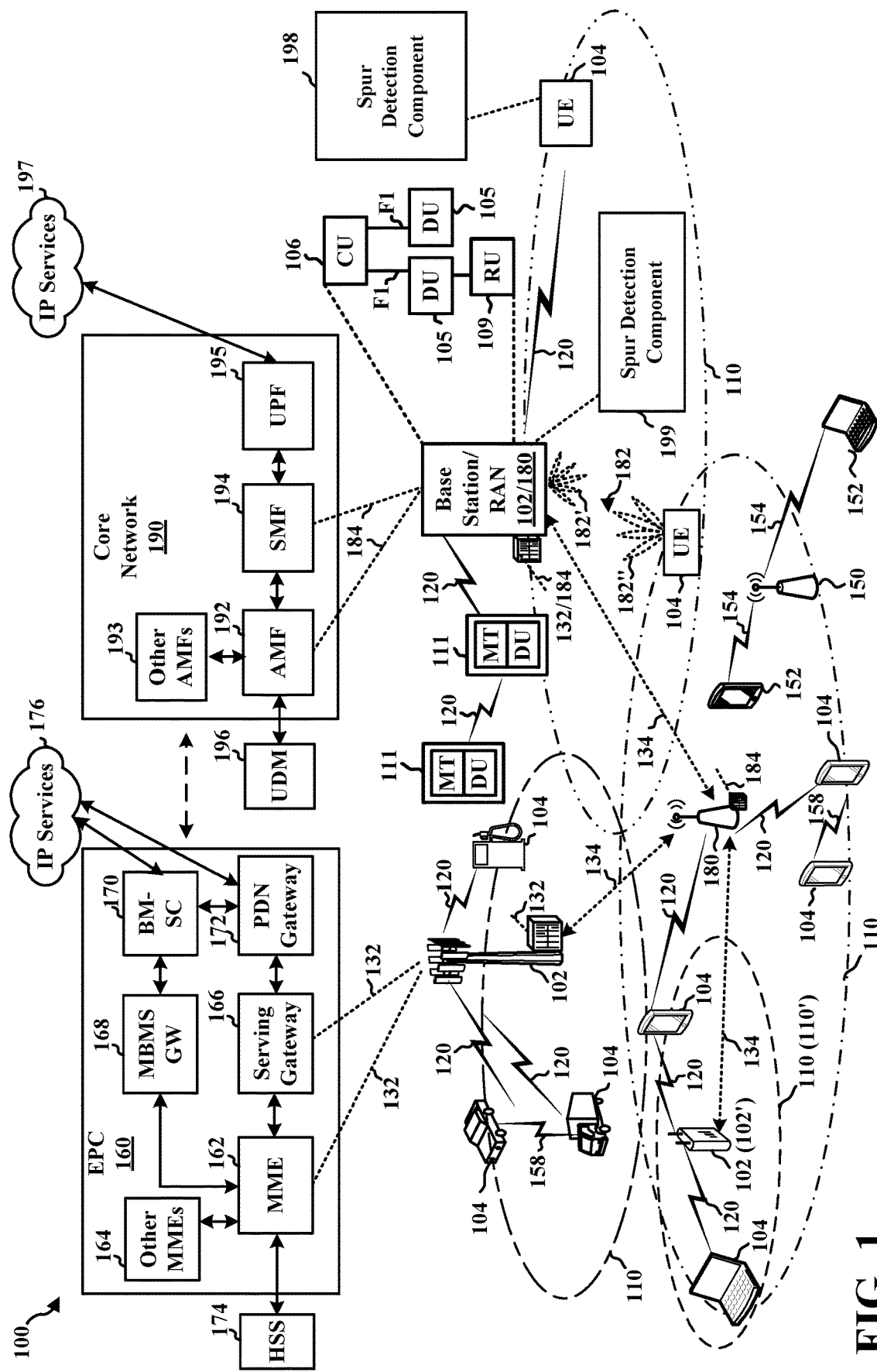
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management.

All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a spur detection component 198 configured to transmit, to a base station, an indication of a UE capability to perform a spur detection based on a plurality of RSs, receive, from the base station, a subset of RS configurations among a set of RS configurations, and receive, from the base station, the plurality of RSs based on the subset of RS configurations, the plurality of RSs spanning each of a plurality of REs in an active BWP. In certain aspects, the base station 180 may include a spur detection component 199 configured to transmit, to a UE, a subset of RS configurations among a set of RS configurations, each RS configuration of the set of RS configurations being associated with at least one of the subset of RS configurations that is associated with a plurality of RSs spanning each of a plurality of REs in an active BWP, and transmit, to the UE, the plurality of RSs based on the subset of RS configurations, the plurality of RSs spanning each of the plurality of REs in the active BWP. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15 [KHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DMRS) (indicated as R for one particular configuration, but other DMRS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DMRS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DMRS (indicated as R for one particular configuration, but other DMRS configurations are possible) for channel estimation at the base station. The UE may transmit DMRS for the physical uplink control channel (PUCCH) and DMRS for the physical uplink shared channel (PUSCH). The PUSCH DMRS may be transmitted in the first one or two symbols of the PUSCH. The PUCCH DMRS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
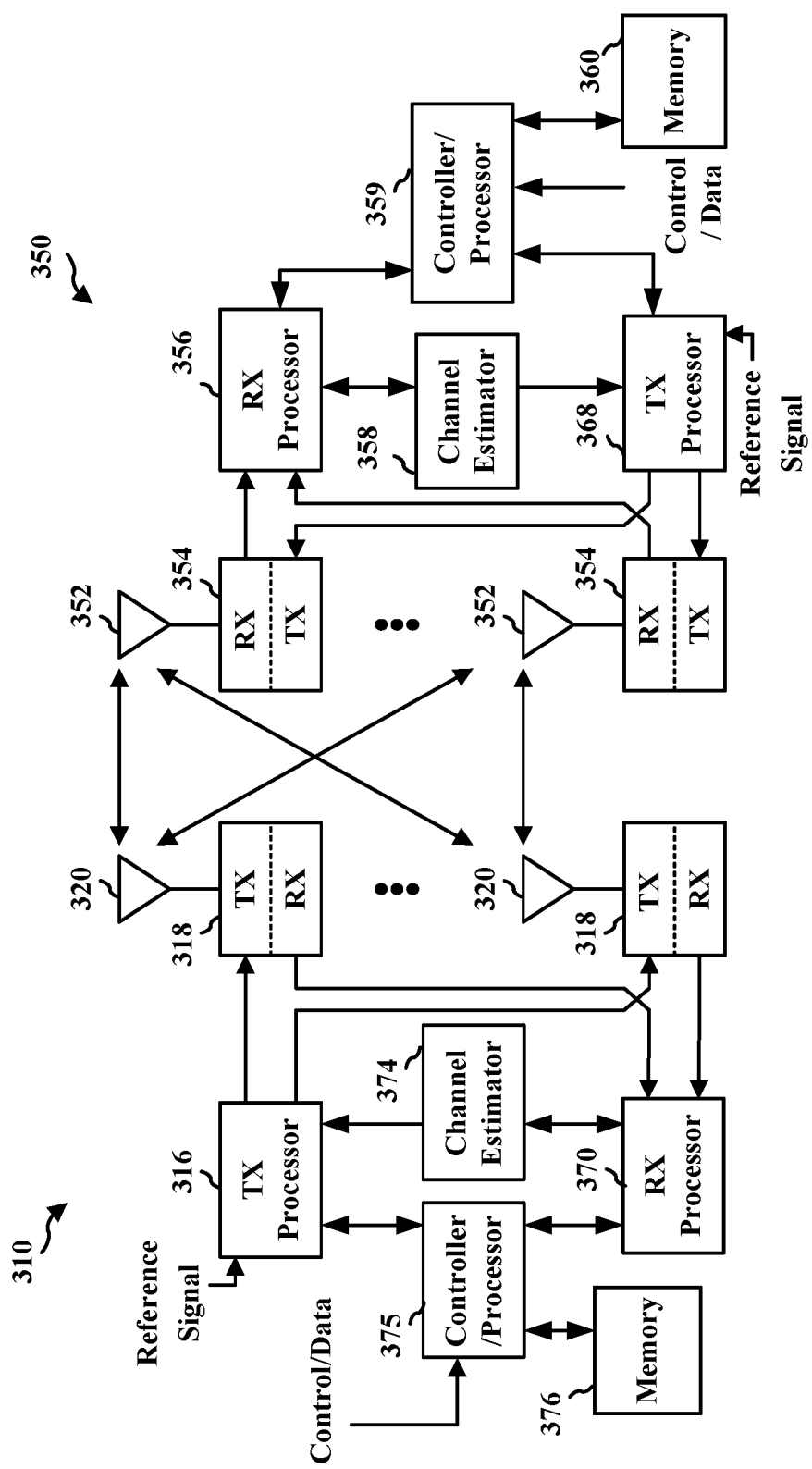
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

In some aspects, the UEs may need to overcome undesired RF energy in the form of radio-frequency-interference (RFI) or spurs. The spurs may take the form of narrow-band frequency signals that result from in-band or out-of-band noise sources. Spurs may cause significant performance degradation if not identified and the current scheme has good detection and mitigation performance.

Unmodulated continuous wave spurs may be generated as a result of intermodulation between different oscillator signals of the RF frontend, and they may fall at any location inside the allocated BW. The spurs may be strong enough and cause severe performance degradations, especially for high MCS allocations. Thus, the UE may remove or notchout the spurs after detecting the spurs.

In some aspects, multiple approaches may be implemented for the spur detection or identification. That is, various implementations of spur detection or identification scheme may be used by the UE to identify or detect spurs to perform a spur mitigation.

In one aspect, a characterization based spur identification may be used to identify spurs. The characterization based spur identification may include performing offline measurements, e.g., at a lab, building a spur database based on the offline measurements, and identify the spur based on the spur database. That is, the UE in a mission mode, e.g., a normal operation, may use the spurs database to obtain the potential spurs' frequencies and apply the notch filter to cancel or mitigate the spurs.

In another aspect, an online detection may be used to identify the spurs while in the mission mode and mitigate the spurs. That is, the UE may perform a dynamic detection of the spurs on-the-fly and apply the mitigation or cancellation techniques for the detected spurs. For example, the dynamic spur detection may be based on at least one reference signal (RS), e.g., a downlink RS (DL-RS) or a demodulation RS (DMRS).

To implement the characterization based spur mitigation, the UE may create a spur database which contains the spur location and spur level. That is, the UE may be configured with the spur database based on the offline measurements. However, detailed analysis may show that some spurs listed in the spur database may not be observed in some of the devices, and vice versa. Hence, the above spur database may not solely be relied upon. Moreover, the spurs may have a dynamic nature, and may be strongly affected by the EMC effects and thermal scenarios/variations. Therefore, the location and/or level of the spurs may change from time-to-time and from device-to-device. That is, the spur may have different locations and levels based on the wireless communication environment as well as the characteristics of the network, and the use of spur database may not provide the most effective way to mitigate the spurs.

In multi-RAT concurrency scenarios, a characterization table per RAT combination with specific operational frequencies may be provided for the characterization based spur mitigation. The nature of the extensive characterization table per RAT combination for each operational frequency may complicate the characterization process and have an extra cost impact. Furthermore, the characterization based spur mitigation in the multi-RAT concurrency scenario may not account for the spur behaviors in a number of dynamic operations, e.g., fast frequency hopping (FFH), automatic gain control (AGC) loop, automatic frequency control (AFC) loop, component carriers (CCs) activation/deactivation, thermal aspects, etc., some of which may utilize re-convergence of the notch filter (with or without resetting), thus limiting the effectiveness of the spur mitigation. Therefore, an improved algorithm or approach may be provided to dynamically detect spurs on individual UEs at a respective time.

To dynamically detect spurs during the operational flows of the UE without any Rx/Tx disruptions, the online spur mitigation scheme may be capable of identifying the spurs in the presence of wireless communication, e.g., 5G NR, signals. For example, the UE may be configured to use the DMRS symbols to identify the spurs based on the presence of signals with a high signal-to-spur ratio. The DMRS may be an effective RS for dynamic spur mitigation since DMRS is allocated together with the PDSCH for the UE to perform the channel estimation for the received signal.

Figure 4:
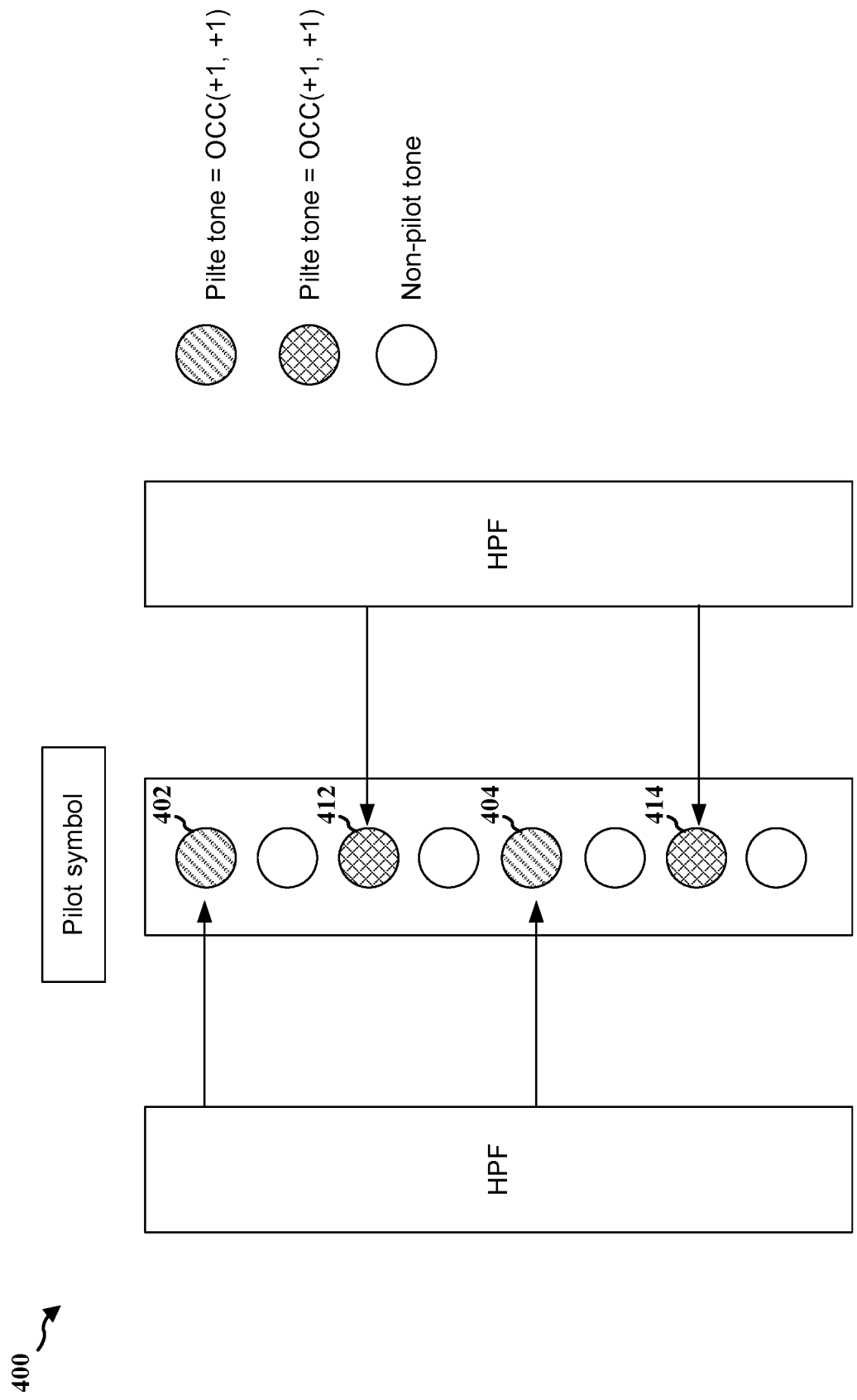
FIG. 4 illustrates an example spur detection algorithm of a method of wireless communication.

FIG. 4 illustrates a diagram 400 of an example spur detection algorithm of a method of wireless communication. The spur detection algorithm may utilize pilot tones to identify the spurs. Here, the spurs may be detected as a significant change in the estimated channel or noise between the neighbor tones, while the assumption is that the actual channel changes slowly between the tones.

One of the options to implement the above differentiator is to apply a high-pass filter (HPF) on the signal which consists of the descrambled tones of the same type. In one example, the tones may have the same port combination. In another example, the tones may have the same orthogonal cover code (OCC) weights combination.

Referring to FIG. 4, the pilot symbol may include multiple pilot tones. The first pilot tone 402 and the fifth pilot tone 404 may have a first OCC weight combination of (+1, +1), and the third pilot tone 412 and the seventh pilot tone 414 may have a second OCC weight combination of (+1, −1). The UE may apply the HPF to the pilot tones with the same OCC weight combination to determine whether the pilot tones with the same OCC weight combination shows any significant change. For example, the HPF may have [−0.5, 1, −0.5] for non-corner tones and [1, −0.5, −0.5] or [−0.5, −0.5, 1] for corner tones.

The spurs are the unwanted signal or noise which may have a narrow power spectral density (PSD). Accordingly, the DMRS-based dynamic spur detection may have a good performance in case that DMRS occupies or is allocated on all the REs of DMRS symbols. Otherwise, in case all the spurs (or some of them) fall on the non-pilot tone/RE, the ability to identify the spurs may be limited. That is, when the DMRS fails to occupy all the REs of the DMRS symbols, the UE may not properly detect the spur that occurs in the non-pilot tone or RE.

In some aspects, several frequency division (FD) pilot patterns of DMRS symbols may be defined in a specification for the network including the base station and the UE. Each of these patterns may have a specific ratio/density of the pilot REs with respect to the number or REs in each RB or equivalently the total number of REs in each PDSCH allocation, e.g., 1, ½, ⅓, or ⅔, across all the relevant DMRS ports per allocation. For example, a first DMRS configuration may allocate DMRS pilot tones in even REs, and provide half of the total REs of the active bandwidth part (BWP).

Whether the DMRS as configured may occupy all the REs of DMRS symbols may depend on a combination of number of DMRS ports, specific ports selection, and DMRS type used in a specific allocation.

In some cases, the FD pattern of DMRS as configured may not be able to occupy all the REs of the allocation range, and in some scenarios specific DMRS ports can be indicated via DCI such that a predefined subset of REs can be occupied by DMRS in general with any valid signaling/selection of the used DMRS ports per allocation. That is, some of the DMRS ports indicated via DCI may not have corresponding DMRS port configurations available to allocate the DMRS pilot tones spanning each of the REs in the active BWP, and a predefined subset of REs may be occupied by the DMRS tones. Accordingly, due to the limitation, the set of DMRS may not cover all the REs in context of reliable spur detection even across several allocations while each one of them can be signaled with a different combination of DMRS ports, and the UE may not detect the spur that falls on the non-pilot tone or the RE that is not covered by DMRS RE in any recent allocation.

The dynamic spur detection may have two different slot levels. In one aspect, an intra-slot detection may provide the spur detection over a single slot. In the context of DMRS-based detection, all the spanned by the allocation tones/REs may be or covered by the DMRS or not occupied by the DMRS or data, e.g., empty, at least on one of the DMRS symbols in every slot. That is, to support the intra-slot spur detection, the DMRS may be configured to span each of the REs in the active BWP for each slot.

In another aspect, an inter-slot detection may provide the spur detection over multiple slots. In the context of DMRS-based detection, all of the spanned by the allocation tones/REs may be or covered by the DMRS or not occupied by the DMRS or data, e.g., empty, at least on one of the DMRS symbols over multiple slots. That is, to support the inter-slot spur detection, a set of DMRS port configurations may be configured to span each of the REs in the active BWP over multiple slots.

To satisfy, follow, or support the above specifications for the inter-slot spur detection, which are pre-requisites for a reliable and efficient online spur detection/mitigation, a complementary specification definitions or additions of the DMRS port configurations may be introduced to provide the set of DMRS port configurations to provide a set of DMRS spanning each of the REs in the active BWP over multiple slots such that the UE may receive the DMRS tones for each of the REs in the active BWP to perform the dynamic spur detection/mitigation.

In some aspects, the DMRS ports may be signaled via DCI, e.g., in the antenna_ports field. For example, the existing specification may provide a set of definitions for available options for DMRS ports signaling or selection in the DL, and each of the DMRS port configurations may fall into one of the two categories of DMRS port configurations.

In one aspect, the first category of DMRS ports may be associated with the DMRS port configurations that may have a full flexibility to select any valid DMRS port combination for the UE such that the DMRS ports may alternate between the DMRS port combination for the UE over different PDSCH allocations to cover/sweep all the relevant REs covered by the active BWP configured for the UE. This is possible every time the number of code-division multiplexing (CDM) groups without data gets a maximum possible value per the used DMRS type. That is, for any DMRS port configuration from the first category, a set of DMRS port configurations may be selected to support the DMRS-based spur detection, such that combination of the DMRSs not multiplexed with data may span each of the REs in the active BWP. Accordingly, for the first category of DMRS ports, the base station and the UE may have no problem to select/alternate the selected DMRS ports across different allocations to sweep all the REs with DMRS REs that are not multiplexed without data.

In another aspect, the second category of DMRS ports may be associated with the DMRS port configurations that may have a limited number of CDM groups without data. That is, at least a part of the REs in the active BWP is multiplexed with data for the addressed UE/allocation. Under the second category, there is no full flexibility with the DMRS ports selection/signaling via DCI. That is, in this case, the lowest DMRS ports supporting the corresponding number of CDM groups without the data may be dynamically selected via the DCI, and all the other DMRS ports may not be selected within the second category of DMRS ports.

In some aspects, the base station may instruct the UE with one of the following DMRS RRC parameters including the dmrs-Type and maxLength, as provided in the following Table 0.

TABLE 0

Antenna ports and number of layers

| dmrs-type | maxLength | Bit field length in DCI |
|---|---|---|
| 1 | 1 | 4 |
| 1 | 2 | 5 |
| 2 | 1 | 5 |
| 2 | 1 | 6 |

In one example, the RRC parameters may indicate the antenna ports (1000+DMRS port), dmrs-Type=1, maxLength=1, one TCI state, and the MIMO configurations may be configured as provided in the following Table 1-1.

TABLE 1-1

Antenna port(s) (1000 + DMRS port),
dmrs-Type = 1, maxLength = 1, one TCI state
One Codeword: Codeword 0 enabled, Codeword 1 disabled

| Value | Number of DMRS CDM group(s) without data | DMRS port(s) | Which REs can be covered by DMRS ports alternation |
|---|---|---|---|
| 0 | 1 | 0 | Even REs (for 1 or |
| 1 | 1 | 1 | 2 layers case) |
| 2 | 1 | 0, 1 | |
| 3 | 2 | 0 | Full coverage can |

TABLE 1-1-continued

Antenna port(s) (1000 + DMRS port),
dmrs-Type = 1, maxLength = 1, one TCI state
One Codeword: Codeword 0 enabled, Codeword 1 disabled

| Value | Number of DMRS CDM group(s) without data | DMRS port(s) | Which REs can be covered by DMRS ports alternation |
|---|---|---|---|
| 4 | 2 | 1 | be achieved |
| 5 | 2 | 2 | (for 1-4 layers case) |
| 6 | 2 | 3 | |
| 7 | 2 | 0, 1 | |
| 8 | 2 | 2, 3 | |
| 9 | 2 | 0-2 | |
| 10 | 2 | 0-3 | |
| 11 | 2 | 0, 2 | |
| 12-15 | Reserved | Reserved | |

Based on Table 1-1, the MIMO configurations associated with the DCI bit field value 3-11 may provide full coverage for a 1-4 layer case, and therefore, may fall within the first category of DMRS ports, which may have the full flexibility to select any valid DMRS port combinations for the UE that is most suitable. However, the MIMO configurations associated with the DCI bit field value 0, 1, and 2 may provide cover for even REs for a 1 or 2 layer case, and therefore, may fall within the second category of DMRS ports, which do not have the full flexibility to select the most suitable DMRS port combinations for the UE. For example, in an example of millimeter wave with a high MCS, the MIMO configuration associated with the DCI bit field value 2 may be selected. However, since the DMRS port configuration associated with the DCI bit field value 2 falls within the second category of the DMRS ports, the DMRS as configured may not support the dynamic spur detection.

In another example, the RRC parameters may indicate the antenna port(s) (1000+DMRS port), dmrs-Type=1, maxLength=2, one TCI state, and the MIMO configurations may be configured as provided in the following Table 1-2.

TABLE 1-2

Antenna port(s) (1000 + DMRS port),
dmrs-Type = 1, maxLength = 2, one TCI state
One Codeword: Codeword 0 enabled, Codeword 1 disabled

| Value | Number of DMRS CDM group(s) without data | DMRS port(s) | Number of front-load symbols | Which REs can be covered by DMRS ports alternation |
|---|---|---|---|---|
| 0 | 1 | 0 | 1 | Even REs |
| 1 | 1 | 1 | 1 | (for 1 or 2 layers case) |
| 2 | 1 | 0, 1 | 1 | |
| 3 | 2 | 0 | 1 | Full coverage can be achieved |
| 4 | 2 | 1 | 1 | (for 1-4 layers case) |
| 5 | 2 | 2 | 1 | |
| 6 | 2 | 3 | 1 | |
| 7 | 2 | 0, 1 | 1 | |
| 8 | 2 | 2, 3 | 1 | |
| 9 | 2 | 0-2 | 1 | |
| 10 | 2 | 0-3 | 1 | |
| 11 | 2 | 0, 2 | 1 | |
| 12 | 2 | 0 | 2 | |
| 13 | 2 | 1 | 2 | |
| 14 | 2 | 2 | 2 | |
| 15 | 2 | 3 | 2 | |
| 16 | 2 | 4 | 2 | |
| 17 | 2 | 5 | 2 | |
| 18 | 2 | 6 | 2 | |
| 19 | 2 | 7 | 2 | |
| 20 | 2 | 0, 1 | 2 | |
| 21 | 2 | 2, 3 | 2 | |
| 22 | 2 | 4, 5 | 2 | |
| 23 | 2 | 6, 7 | 2 | |
| 24 | 2 | 0, 4 | 2 | |
| 25 | 2 | 2, 6 | 2 | |
| 26 | 2 | 0, 1, 4 | 2 | |
| 27 | 2 | 2, 3, 6 | 2 | |
| 28 | 2 | 0, 1, 4, 5 | 2 | |
| 29 | 2 | 2, 3, 6, 7 | 2 | |
| 30 | 2 | 0, 2, 4, 6 | 2 | |
| 31 | Reserved | Reserved | Reserved | |

Based on Table 1-2, the MIMO configurations associated with the DCI bit field value 3-31 may provide full coverage for a 1-4 layer case, and therefore, may fall within the first category of DMRS ports, which may have the full flexibility to select any valid DMRS port combinations for the UE that is most suitable. However, the MIMO configurations associated with the DCI bit field value 0, 1, and 2 may provide cover for even REs for a 1 or 2 layer case, and therefore, may fall within the second category of DMRS ports, which do not have the full flexibility to select the most suitable DMRS port combinations for the UE. For example, in an example of millimeter wave with a high MCS, the MIMO configuration associated with the DCI bit field value 2 may be selected. However, since the DMRS port configuration associated with the DCI bit field value 2 falls within the second category of the DMRS ports, the DMRS as configured may not support the dynamic spur detection.

In another example, the RRC parameters may indicate the antenna port(s) (1000+DMRS port), dmrs-Type=2, maxLength=1, one TCI state, and the MIMO configurations may be configured as provided in the following Table 1-3.

TABLE 1-3

Antenna port(s) (1000 + DMRS port),
dmrs-Type = 2, maxLength = 1, oneTCI state

| Value | Number of DMRS CDM group(s) without data | DMRS port(s) | Which REs can be covered by DMRS ports alternation |
|---|---|---|---|
| 0 | 1 | 0 | mod(tone, 6) = 0 |
| 1 | 1 | 1 | mod(tone, 6) = 1 |
| 2 | 1 | 0, 1 | (⅓ of REs can be covered) |
| 3 | 2 | 0 | mod(tone, 6) = 0 |
| 4 | 2 | 1 | mod(tone, 6) = 1 |
| 5 | 2 | 2 | mod(tone, 6) = 2 |
| 6 | 2 | 3 | mod(tone, 6) = 3 |
| 7 | 2 | 0, 1 | (⅔ of REs can be covered) |
| 8 | 2 | 2, 3 | |
| 9 | 2 | 0-2 | |
| 10 | 2 | 0-3 | |
| 11 | 3 | 0 | Full coverage can be achieved |
| 12 | 3 | 1 | (for 1-4 layers case) |
| 13 | 3 | 2 | |
| 14 | 3 | 3 | |
| 15 | 3 | 4 | |
| 16 | 3 | 5 | |
| 17 | 3 | 0, 1 | |
| 18 | 3 | 2, 3 | |
| 19 | 3 | 4, 5 | |
| 20 | 3 | 0-2 | |
| 21 | 3 | 3-5 | |
| 22 | 3 | 0-3 | |

TABLE 1-3-continued

Antenna port(s) (1000 + DMRS port),
dmrs-Type = 2, maxLength = 1, oneTCI state

| Value | Number of DMRS CDM group(s) without data | DMRS port(s) | Which REs can be covered by DMRS ports alternation |
|---|---|---|---|
| 23 | 2 | 0, 2 | mod(tone, 6) = 0, 1, 2, 3 |
| 24-31 | Reserved | Reserved | |

Based on Table 1-3, the MIMO configurations associated with the DCI bit field value 11-22 may provide full coverage for a 1-4 layer case, and therefore, may fall within the first category of DMRS ports, which may have the full flexibility to select any valid DMRS port combinations for the UE that is most suitable. However, the MIMO configurations associated with the DCI bit field value 0-10 and 23 may not provide full coverage of DMRS REs, and may fall within the second category of DMRS ports, which do not have the full flexibility to select the most suitable DMRS port combinations for the UE. Particularly, the MIMO configurations associated with the DCI bit field value 0-2 may cover the DMRS REs associated with mod(tone, 6)=0 and mod(tone, 6)=1, e.g., covering ⅓ of the total REs in the active BWP, and the MIMO configurations associated with the DCI bit field value 3-10, and 23 may cover the DMRS REs associated with mod(tone, 6)=0, 1, 2, 3, e.g., covering ⅔ of the total REs in the active BWP.

In yet another example, the RRC parameters may indicate the antenna port(s) (1000+DMRS port), dmrs-Type=2, maxLength=2, one TCI state, and the MIMO configurations may be configured as provided in the following Table 1-4.

TABLE 1-4

Antenna port(s) (1000 + DMRS port),
dmrs-Type = 2, maxLength = 2, one TCI state
One Codeword: Codeword 0 enabled, Codeword 1 disabled

| Value | Number of DMRS CDM group(s) without data | DMRS port(s) | Number of front-load symbols | Which REs can be covered by DMRS ports alternation |
|---|---|---|---|---|
| 0 | 1 | 0 | 1 | mod(tone, 6) = 0 |
| 1 | 1 | 1 | 1 | mod(tone, 6) = 1 |
| 2 | 1 | 0, 1 | 1 | (⅓ of REs covered) |
| 3 | 2 | 0 | 1 | mod(tone, 6) = 0 |
| 4 | 2 | 1 | 1 | mod(tone, 6) = 1 |
| 5 | 2 | 2 | 1 | mod(tone, 6) = 2 |
| 6 | 2 | 3 | 1 | mod(tone, 6) = 3 |
| 7 | 2 | 0, 1 | 1 | (⅔ of REs covered) |
| 8 | 2 | 2, 3 | 1 | |
| 9 | 2 | 0-2 | 1 | |
| 10 | 2 | 0-3 | 1 | |
| 11 | 3 | 0 | 1 | Full coverage can be achieved (for 1-4 layers case) |
| 12 | 3 | 1 | 1 | |
| 13 | 3 | 2 | 1 | |
| 14 | 3 | 3 | 1 | |
| 15 | 3 | 4 | 1 | |
| 16 | 3 | 5 | 1 | |
| 17 | 3 | 0, 1 | 1 | |
| 18 | 3 | 2, 3 | 1 | |
| 19 | 3 | 4, 5 | 1 | |
| 20 | 3 | 0-2 | 1 | |
| 21 | 3 | 3-5 | 1 | |
| 22 | 3 | 0-3 | 1 | |
| 23 | 3 | 0, 2 | 1 | |
| 24 | 3 | 0 | 2 | |
| 25 | 3 | 1 | 2 | |
| 26 | 3 | 2 | 2 | |
| 27 | 3 | 3 | 2 | |
| 28 | 3 | 4 | 2 | |
| 29 | 3 | 5 | 2 | |
| 30 | 3 | 6 | 2 | |
| 31 | 3 | 7 | 2 | |
| 24 | 3 | 8 | 2 | |
| 25 | 3 | 9 | 2 | |
| 26 | 3 | 10 | 2 | |
| 27 | 3 | 11 | 2 | |
| 28 | 3 | 0, 1 | 2 | |
| 29 | 3 | 2, 3 | 2 | |
| 30 | 3 | 4, 5 | 2 | |
| 31 | 3 | 6, 7 | 2 | |
| 32 | 3 | 8, 9 | 2 | |
| 33 | 3 | 10, 11 | 2 | |
| 34 | 3 | 0, 1, 6 | 2 | |
| 35 | 3 | 2, 3, 8 | 2 | |
| 36 | 3 | 4, 5, 10 | 2 | |
| 37 | 3 | 0, 1, 6, 7 | 2 | |
| 38 | 3 | 2, 3, 8, 9 | 2 | |
| 39 | 3 | 4, 5, 10, 11 | 2 | |
| 40 | 3 | 0 | 2 | |
| 41 | 3 | 1 | 2 | |
| 42 | 3 | 2 | 2 | |
| 43 | 3 | 3 | 2 | |
| 44 | 3 | 4 | 2 | |
| 45 | 3 | 5 | 2 | |
| 46 | 3 | 0, 1 | 2 | |
| 47 | 3 | 2, 3 | 2 | |
| 48 | 1 | 0 | 2 | |
| 49 | 1 | 1 | 2 | |
| 50 | 1 | 6 | 2 | |
| 51 | 1 | 7 | 2 | |
| 52 | 1 | 0, 1 | 2 | |
| 53 | 1 | 6, 7 | 2 | |
| 54 | 2 | 0, 1 | 2 | |
| 55 | 2 | 2, 3 | 2 | |
| 56 | 2 | 6, 7 | 2 | |
| 57 | 2 | 8, 9 | 2 | |
| 58-63 | Reserved | Reserved | Reserved | |

Based on Table 1-4, the MIMO configurations associated with the DCI bit field value 11-47 may provide full coverage for a 1-4 layer case, and therefore, may fall within the first category of DMRS ports, which may have the full flexibility to select any valid DMRS port combinations for the UE that is most suitable. However, the MIMO configurations associated with the DCI bit field values 0-10 and 48-57 may not provide full coverage of DMRS REs, and may fall within the second category of DMRS ports, which do not have the full flexibility to select the most suitable DMRS port combinations for the UE. Particularly, the MIMO configurations associated with the DCI bit field value 0-2 and 48-53 may cover the DMRS REs associated with mod(tone, 6)=0 and mod(tone, 6)=1, e.g., covering ⅓ of the total REs in the active BWP, and the MIMO configurations associated with the DCI bit field value 3-10 and 54-57 may cover the DMRS REs associated with mod(tone, 6)=0, 1, 2, 3, e.g., covering ⅔ of the total REs in the active BWP.

In some aspects, the MIMO configuration for each RRC parameter set may be extended to include at least one complementary DMRS port configurations such that the additional options of valid DMRS port combinations may provide the missing DMRS ports to cover/sweep all the active BWP tones with DMRS REs across several allocations. That is, the modified MIMO configurations may include a subset of DMRS port configurations for each DMRS port configuration, such that the subset of DMRS port configuration is associated with a set of DMRS REs that may span each of the plurality of REs in the active BWP assigned for the UE.

Furthermore, the UE may transmit, to the base station, a new signaling of UE capabilities to perform the spur detection based on the DMRS symbols to encourage NW to alternate DMRS ports across allocations for the UE to sweep all the relevant REs with the DMRS REs.

In one aspect, the RRC parameters may indicate the antenna ports (1000+DMRS port), dmrs-Type=1, maxLength=1, one TCI state, and the MIMO configurations may be configured as provided in the following Table 2-1.

TABLE 2-1

Antenna port(s) (1000 + DMRS port),
dmrs-Type = 1, maxLength = 1, oneTCI state
One Codeword: Codeword 0 enabled, Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12 | 1 | 2 |
| 13 | 1 | 3 |
| 14 | 1 | 2, 3 |
| 15 | Reserved | Reserved |

Based on Table 2-1, the modified MIMO configuration set may include additional DMRS port configurations associated with the DCI bit field values 12-14, which may be the complementary DMRS port configurations for the DMRS configurations associated with the DCI bit field value 0, 1, and 2. Accordingly, every DMRS port configurations of the MIMO configuration set may provide full coverage for the spur detection, and therefore, may fall within the first category of DMRS ports, which may have the full flexibility to select any valid DMRS port combinations for the UE that is most suitable. Here, the complementary DMRS port configurations associated with the DCI bit field value 12-14 may be configured within the reserved DCI bit field values, e.g., 12-14, and the complementary DMRS port configurations may be provided without an extension of the DCI field size.

In another example, the RRC parameters may indicate the antenna port(s) (1000+DMRS port), dmrs-Type=1, maxLength=2, one TCI state, and the MIMO configurations may be configured as provided in the following Table 2-2.

TABLE 2-2

Antenna port(s) (1000 + DMRS port),
dmrs-Type = 1, maxLength = 2, one TCI state
One Codeword: Codeword 0 enabled, Codeword 1 disabled

| Value | Number of DMRS CDM group(s) without data | DMRS port(s) | Number of front-load symbols |
|---|---|---|---|
| 0 | 1 | 0 | 1 |
| 1 | 1 | 1 | 1 |
| 2 | 1 | 0, 1 | 1 |

TABLE 2-2-continued

Antenna port(s) (1000 + DMRS port),
dmrs-Type = 1, maxLength = 2, one TCI state
One Codeword: Codeword 0 enabled, Codeword 1 disabled

| Value | Number of DMRS CDM group(s) without data | DMRS port(s) | Number of front-load symbols |
|---|---|---|---|
| 3 | 2 | 0 | 1 |
| 4 | 2 | 1 | 1 |
| 5 | 2 | 2 | 1 |
| 6 | 2 | 3 | 1 |
| 7 | 2 | 0, 1 | 1 |
| 8 | 2 | 2, 3 | 1 |
| 9 | 2 | 0-2 | 1 |
| 10 | 2 | 0-3 | 1 |
| 11 | 2 | 0, 2 | 1 |
| 12 | 2 | 0 | 2 |
| 13 | 2 | 1 | 2 |
| 14 | 2 | 2 | 2 |
| 15 | 2 | 3 | 2 |
| 16 | 2 | 4 | 2 |
| 17 | 2 | 5 | 2 |
| 18 | 2 | 6 | 2 |
| 19 | 2 | 7 | 2 |
| 20 | 2 | 0, 1 | 2 |
| 21 | 2 | 2, 3 | 2 |
| 22 | 2 | 4, 5 | 2 |
| 23 | 2 | 6, 7 | 2 |
| 24 | 2 | 0, 4 | 2 |
| 25 | 2 | 2, 6 | 2 |
| 26 | 2 | 0, 1, 4 | 2 |
| 27 | 2 | 2, 3, 6 | 2 |
| 28 | 2 | 0, 1, 4, 5 | 2 |
| 29 | 2 | 2, 3, 6, 7 | 2 |
| 30 | 2 | 0, 2, 4, 6 | 2 |
| 31 | 1 | 2 | 1 |
| 32 | 1 | 2, 3 | 1 |
| 33-63 | Reserved | Reserved | Reserved |

Based on Table 2-2, the modified MIMO configuration set may include additional DMRS port configurations associated with the DCI bit field values 31 and 32, which may be the complementary DMRS port configurations for the DMRS configurations associated with the DCI bit field values 0, 1, and 2. Accordingly, every DMRS port configurations of the MIMO configuration set may provide full coverage for the spur detection, and therefore, may fall within the first category of DMRS ports, which may have the full flexibility to select any valid DMRS port combinations for the UE that is most suitable. Here, the complementary DMRS port configurations associated with the DCI bit field value 31 and 32 may not be configured within the reserved DCI bit field value, e.g., 31. In one aspect, to support the two additional DMRS port configurations including the DCI bit field value 32, the complementary DMRS port configurations may be provided by increasing the bit field length of the DCI. That is, the bit field length in DCI may be increased from 5 to 6 to support the additional DMRS port configurations associated with the DCI bit field value 32. In another aspect, to support the two additional DMRS port configurations with one reserved bit field value without an extension of the DCI field size, one of the two additional DMRS port configurations associated with the DCI bit field value 31 or 32 may be added instead of one of the DMRS port configurations associated with the existing DCI bit field values, e.g., the DCI bit field values 3-30.

In another example, the RRC parameters may indicate the antenna port(s) (1000+DMRS port), dmrs-Type=2, maxLength=1, one TCI state, and the MIMO configurations may be configured as provided in the following Table 2-3.

TABLE 2-3

Antenna port(s) (1000 + DMRS port),
dmrs-Type = 2, maxLength = 1, one TCI state
One Codeword: Codeword 0 enabled, Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 3 | 0 |
| 12 | 3 | 1 |
| 13 | 3 | 2 |
| 14 | 3 | 3 |
| 15 | 3 | 4 |
| 16 | 3 | 5 |
| 17 | 3 | 0, 1 |
| 18 | 3 | 2, 3 |
| 19 | 3 | 4, 5 |
| 20 | 3 | 0-2 |
| 21 | 3 | 3-5 |
| 22 | 3 | 0-3 |
| 23 | 2 | 0, 2 |
| 24 | 1 | 2 |
| 25 | 1 | 4 |
| 26 | 1 | 2, 3 |
| 27 | 1 | 4, 5 |
| 28 | 2 | 4 |
| 29 | 2 | 4, 5 |
| 30 | 2 | 3-5 |
| 31 | 2 | 2-5 |

Based on Table 2-3, the modified MIMO configuration set may include additional DMRS port configurations associated with the DCI bit field values 24-31, which may be the complementary DMRS port configurations for the DMRS configurations associated with the DCI bit field values 0-10 and 23. Accordingly, every DMRS port configurations of the MIMO configuration set may provide full coverage for the spur detection, and therefore, may fall within the first category of DMRS ports, which may have the full flexibility to select any valid DMRS port combinations for the UE that is most suitable. Here, the complementary DMRS port configurations associated with the DCI bit field value 24-31 may be configured within the reserved DCI bit field values, e.g., 24-31, and the complementary DMRS port configurations may be provided without an extension of the DCI field size.

TABLE 2-4

Antenna port(s) (1000 + DMRS port),
dmrs-Type = 2, maxLength = 2, one TCI state
One Codeword: Codeword 0 enabled, Codeword 1 disabled

| Value | Number of DMRS CDM group(s) without data | DMRS port(s) | Number of front-load symbols |
|---|---|---|---|
| 0 | 1 | 0 | 1 |
| 1 | 1 | 1 | 1 |
| 2 | 1 | 0, 1 | 1 |
| 3 | 2 | 0 | 1 |
| 4 | 2 | 1 | 1 |
| 5 | 2 | 2 | 1 |
| 6 | 2 | 3 | 1 |
| 7 | 2 | 0, 1 | 1 |
| 8 | 2 | 2, 3 | 1 |
| 9 | 2 | 0-2 | 1 |
| 10 | 2 | 0-3 | 1 |
| 11 | 3 | 0 | 1 |
| 12 | 3 | 1 | 1 |
| 13 | 3 | 2 | 1 |
| 14 | 3 | 3 | 1 |
| 15 | 3 | 4 | 1 |
| 16 | 3 | 5 | 1 |
| 17 | 3 | 0, 1 | 1 |
| 18 | 3 | 2, 3 | 1 |
| 19 | 3 | 4, 5 | 1 |
| 20 | 3 | 0-2 | 1 |
| 21 | 3 | 3-5 | 1 |
| 22 | 3 | 0-3 | 1 |
| 23 | 3 | 0, 2 | 1 |
| 24 | 3 | 0 | 2 |
| 25 | 3 | 1 | 2 |
| 26 | 3 | 2 | 2 |
| 27 | 3 | 3 | 2 |
| 28 | 3 | 4 | 2 |
| 29 | 3 | 5 | 2 |
| 30 | 3 | 6 | 2 |
| 31 | 3 | 7 | 2 |
| 32 | 3 | 8 | 2 |
| 33 | 3 | 9 | 2 |
| 34 | 3 | 10 | 2 |
| 35 | 3 | 11 | 2 |
| 36 | 3 | 0, 1 | 2 |
| 37 | 3 | 2, 3 | 2 |
| 38 | 3 | 4, 5 | 2 |
| 39 | 3 | 6, 7 | 2 |
| 40 | 3 | 8, 9 | 2 |
| 41 | 3 | 10, 11 | 2 |
| 42 | 3 | 0, 1, 6 | 2 |
| 43 | 3 | 2, 3, 8 | 2 |
| 44 | 3 | 4, 5, 10 | 2 |
| 45 | 3 | 0, 1, 6, 7 | 2 |
| 46 | 3 | 2, 3, 8, 9 | 2 |
| 47 | 3 | 4, 5, 10, 11 | 2 |
| 48 | 3 | 0 | 2 |
| 49 | 3 | 1 | 2 |
| 50 | 3 | 2 | 2 |
| 51 | 3 | 3 | 2 |
| 52 | 3 | 4 | 2 |
| 53 | 3 | 5 | 2 |
| 54 | 3 | 0, 1 | 2 |
| 55 | 3 | 2, 3 | 2 |
| 56 | 1 | 0 | 2 |
| 57 | 1 | 1 | 2 |
| 58 | 1 | 6 | 2 |
| 59 | 1 | 7 | 2 |
| 60 | 1 | 0, 1 | 2 |
| 61 | 1 | 6, 7 | 2 |
| 62 | 2 | 0, 1 | 2 |
| 63 | 2 | 2, 3 | 2 |
| 64 | 2 | 6, 7 | 2 |
| 65 | 2 | 8, 9 | 2 |
| 66 | 1 | 2 | 1 |
| 67 | 1 | 3 | 1 |
| 68 | 1 | 4 | 1 |
| 69 | 1 | 5 | 1 |
| 70 | 2 | 4 | 1 |
| 71 | 2 | 5 | 1 |
| 72 | 2 | 4, 5 | 1 |
| 73 | 2 | 3-5 | 1 |
| 74 | 2 | 2-5 | 1 |
| 75 | 1 | 2 | 2 |
| 76 | 1 | 3 | 2 |
| 77 | 1 | 4 | 2 |
| 78 | 1 | 5 | 2 |

TABLE 2-4-continued

Antenna port(s) (1000 + DMRS port),
dmrs-Type = 2, maxLength = 2, one TCI state
One Codeword: Codeword 0 enabled, Codeword 1 disabled

| Value | Number of DMRS CDM group(s) without data | DMRS port(s) | Number of front-load symbols |
|---|---|---|---|
| 73 | 1 | 2, 3 | 2 |
| 74 | 1 | 4, 5 | 2 |
| 75 | 2 | 4 | 2 |
| 76 | 2 | 5 | 2 |
| 77 | 2 | 4, 5 | 2 |
| 78 | 2 | 3-5 | 2 |
| 79 | 2 | 2-5 | 2 |
| 80-127 | Reserved | Reserved | Reserved |

Based on Table 2-4, the modified MIMO configuration set may include additional DMRS port configurations associated with the DCI bit field values 58-79, which may be the complementary DMRS port configurations for the DMRS configurations associated with the DCI bit field values 0-10 and 48-57. Accordingly, every DMRS port configurations of the MIMO configuration set may provide full coverage for the spur detection, and therefore, may fall within the first category of DMRS ports, which may have the full flexibility to select any valid DMRS port combinations for the UE that is most suitable. Here, the complementary DMRS port configurations associated with the DCI bit field value 58-79 may not be configured within the reserved DCI bit field value, e.g., 58-63. To support the additional DMRS port configurations including the DCI bit field values 64-79, the complementary DMRS port configurations may be provided by increasing the bit field length of the DCL. That is, the bit field length in DCI may be increased from 6 to 7 to support the additional DMRS port configurations associated with the DCI bit field values 64-79.

In some aspects, the network may alternate DMRS ports from allocation to allocation to get a full REs coverage by DMRS REs across several allocations. Here, some of the DMRS ports, e.g., the first category of DMRS ports, may be supported with the current DMRS port configurations, while the other DMRS ports, e.g., the second category of DMRS ports, may support the spur detection with the complementary DMRS ports. The network scheduler may also be configured to schedule the DMRS ports alternation to support the DMRS-based spur detection, e.g., in MU-MIMO scenario. To perform the DMRS port alternation for certain UEs, the network may be configured to know whether the corresponding UEs have the capability to perform the DMRS-based spur detection/mitigation. In other words, a UE capable of performing the DMRS-based spur detection/mitigation, the spur mitigation is important for higher MCSs and should be employed by the network in case the MCS is greater than or equal to the MCS threshold value. The MCS threshold value may depend on at least one parameter including UE implementation, UE class (low cost or high tier), UE thermal conditions, RF frequency (band), bands combination (for concurrent multi RAT scenarios), etc. The UE may be configured to signal or transmit the above capabilities of the UE to the base station. That is, the UE may transmit the UE's capabilities to perform the online DMRS based spur mitigation and the MCS threshold value or the at least one parameter associated with the MCS threshold value.

Figure 5:
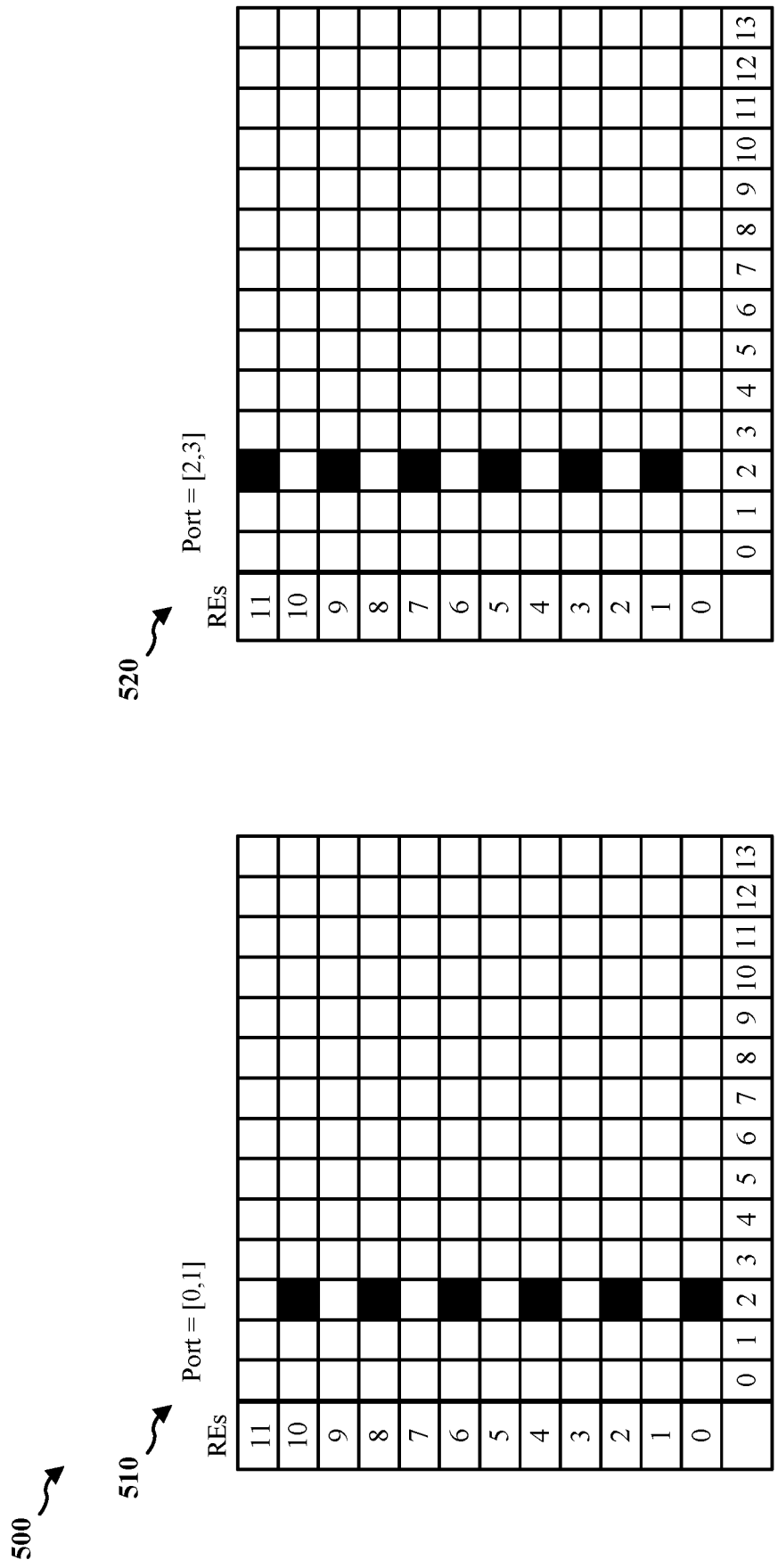
FIG. 5 illustrates example DMRS sets of a method of wireless communication.

FIG. 5 illustrates example DMRS sets 500 of a method of wireless communication. The example DMRS sets 500 may be associated with the RRC parameters including mapping type=A, dmrs-Type=1, maxLength=1, and single DMRS symbol, and the example DMRS sets 500 may include a first DMRS set 510 and a second DMRS set 520. The example DMRS sets 500 may be for a 2-layer transmission case. For example, the example DMRS sets 500 may be associated with Table 2-1. The first DMRS set 510 may correspond with the DCI bit field value 2, and the second DMRS set 520 may correspond with the DCI bit field value 14. In case that existing 2-DMRS port is used, half of the REs will be covered. That is, the first DMRS set 510 may cover the half of the REs of the active BWP. Here, the second DMRS set 520 may be provided by the complementary DMRS port configuration associated with the DCI bit field value 14 to cover the rest half of the REs of the active BWP. The base station may alternate between ports [0,1] and [2, 3] based on some aspects, all the tones can be covered over several allocations. Accordingly, the base station may provide the DMRS based dynamic spur detection/mitigation for spurs falling on any of the relevant REs within the active BWP.

Figure 6:
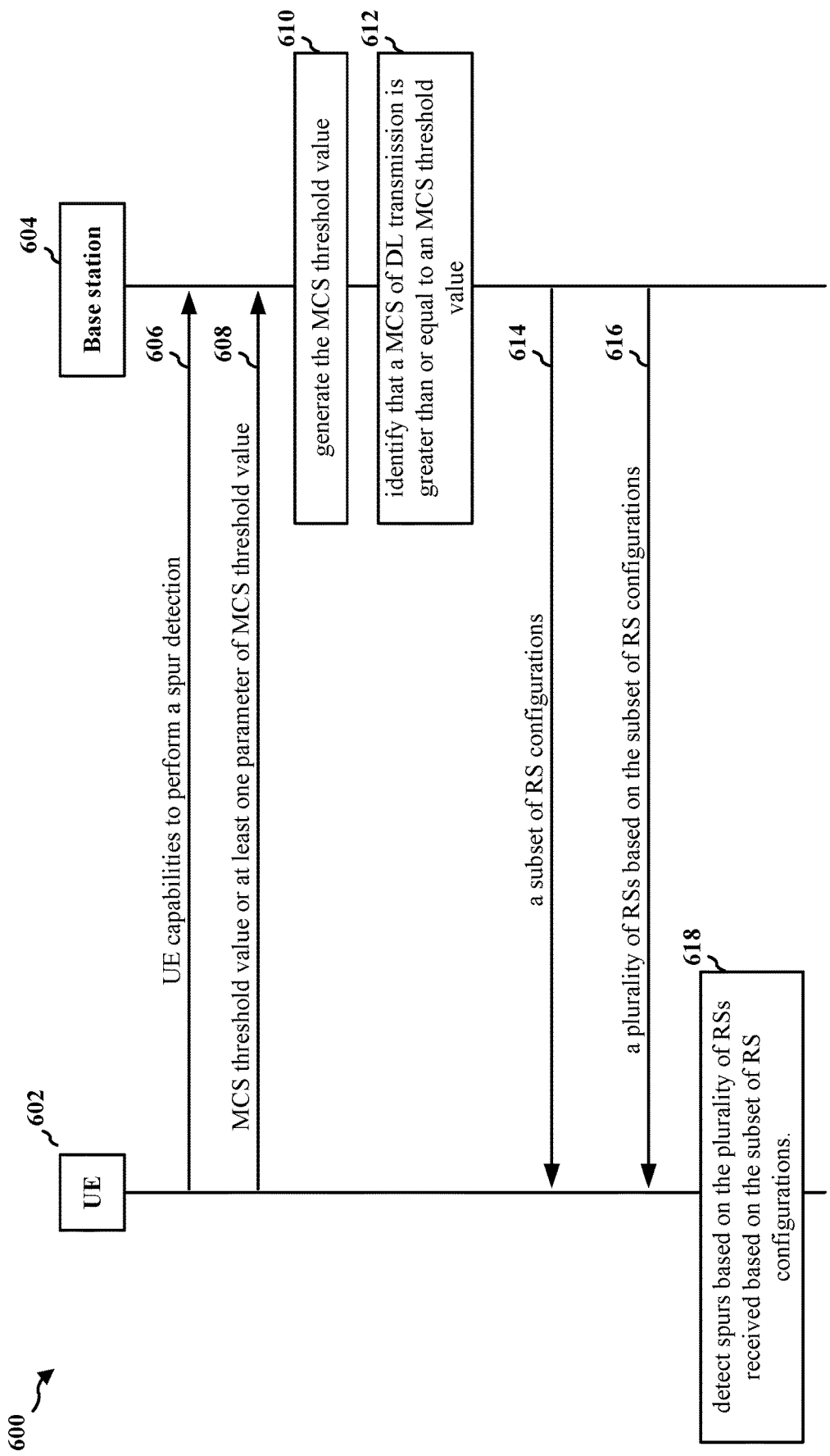
FIG. 6 is a call flow diagram of a method of wireless communication.

FIG. 6 is a call-flow diagram 600 of a method of wireless communication. The call-flow diagram 600 may include a UE 602 and a base station 604. The base station 604 may configure the UE 602 with a subset of RS configurations among a set of RS configurations, and transmit a plurality of RSs based on the subset of RS configurations. The plurality of RSs may be configured to span each of the plurality of REs in the active BWP. The UE 602 may receive the plurality of RSs based on the subset of RS configurations and perform a spur detection based on the plurality of RSs received based on the subset of RS configurations. Here, each RS configuration of the set of RS configurations may be associated with at least one of the subset of RS configurations, and the at least one of the subset of RS configurations may be associated with a plurality of RSs spanning each of a plurality of REs in an active BWP.

At 606, the UE 602 may transmit, to a base station 604, an indication of a UE capability to perform a spur detection based on a plurality of RSs. The base station 604 may receive, from the UE 602, an indication of UE capabilities to perform a spur detection based on the plurality of RSs. In one aspect, the subset of RS configurations may be transmitted based on receiving the indication of the UE capabilities to perform the spur detection based on the plurality of RSs. The subset of RS configurations may include a plurality of DMRS port configurations, and the RS may be the DMRS. The MIMO configuration set including the DMRS port configurations may be modified to include complementary DMRS port configurations in such way that every DMRS port configurations of the MIMO configuration set may provide full coverage for the spur detection.

At 608, the UE 602 may transmit, to the base station 604, an indication of the MCS threshold value or an indication of the at least one parameter of the MCS threshold value. The base station 604 may receive, from the UE 602, an indication of the MCS threshold value or an indication of the at least one parameter of the MCS threshold value. Here, the at least one parameter including one or more of: a UE implementation, a UE class, UE thermal conditions, an RF band, or a combination of bands, where the MCS threshold value is generated based on the at least one parameter.

At 610, the base station 604 may generate the MCS threshold value based on at least one parameter, the at least one parameter including one of more of: a UE implementation, a UE class, UE thermal conditions, an RF band, or a combination of bands. That is, the base station 604 may generate the MCS threshold value based on the at least one parameter received from the UE 602 at 608.

At 612, the base station 604 may identify that the MCS of a downlink transmission to the UE 602 is greater than or equal to an MCS threshold value. The MCS threshold value may be received from the UE 602 at 608 or generated at 610. The spur mitigation may be important for higher MCSs and should be employed by the network in case the MCS is greater than or equal to the MCS threshold value. Therefore, the base station 604 may be configured to transmit the subset of RS configurations and the plurality of RSs to the UE 602 based on determining that the MCS of the DL is greater than or equal to the MCS threshold value.

At 614, the base station 604 may transmit, to the UE 602, a subset of RS configurations among a set of RS configurations, each RS configuration of the set of RS configurations being associated with at least one of the subset of RS configurations that is associated with a plurality of RSs spanning each of a plurality of REs in an active BWP. The UE 602 may receive, from the base station 604, a subset of RS configurations among a set of RS configurations. In one aspect, the plurality of RSs may include a plurality of DMRS. In one aspect, the subset of RS configurations is transmitted via DCI. In one aspect, the additional complementary DMRS port configurations may be associated with reserved bit field values of the DCI. In another aspect, a bit field of the DCI associated with the subset of RS configurations may include an additional bit. That is, in certain aspects, to support the additional complementary DMRS port configurations, the bit field length of the DCI may be increased. In another aspect, the subset of RS configurations may be transmitted and received based on the MCS of the downlink transmission to the UE 602 being greater than or equal to the MCS threshold value.

At 616, the base station 604 may transmit, to the UE 602, the plurality of RSs based on the subset of RS configurations, the plurality of RSs spanning each of the plurality of REs in the active BWP. The UE 602 may receive, from the base station 604, the plurality of RSs based on the subset of RS configurations, the plurality of RSs spanning each of a plurality of REs in an active BWP. Here, to transmit the plurality of RSs to the UE 602, base station 604 may be configured to alternate between each of the plurality of RSs for each allocation for transmitting the plurality of RSs.

At 618, the UE 602 may detect spurs based on the plurality of RSs received based on the subset of RS configurations received from the base station 604. For example, the UE 602 may apply the HPF on the RS including the descrambled tones of the same type. In one example, the tones may have the same port combination. In another example, the tones may have the same orthogonal cover code (OCC) weights combination. Since the plurality of RSs received at 616 may span each of a plurality of REs in an active BWP, the UE 602 may detect the spurs using the RS on each of the plurality or REs in the active BWP.

Figure 7:
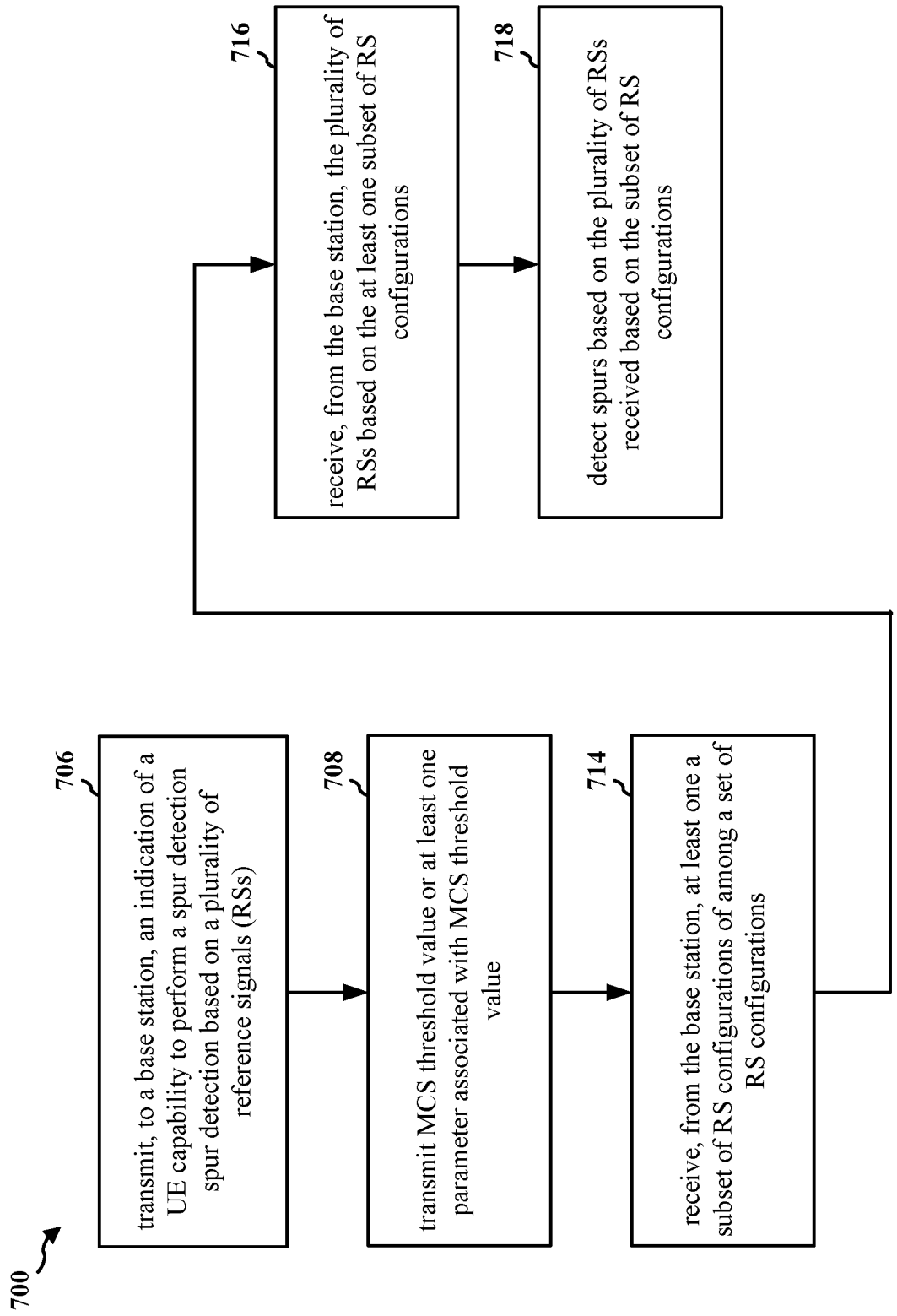
FIG. 7 is a flowchart of a method of wireless communication.

FIG. 7 is a flowchart 700 of a method of wireless communication. The method may be performed by a UE (e.g., the UE 104; the apparatus 1102). The UE may receive a subset of RS configurations among a set of RS configurations, and receive the plurality of RSs based on the subset of RS configurations and perform a spur detection based on the plurality of RSs received based on the subset of RS configurations. The plurality of RSs may be configured to span each of the plurality of REs in the active BWP. Here, each RS configuration of the set of RS configurations may be associated with at least one of the subset of RS configurations, and the at least one of the subset of RS configurations may be associated with a plurality of RSs spanning each of a plurality of REs in an active BWP.

At 706, the UE may transmit, to a base station, an indication of a UE capability to perform a spur detection based on a plurality of RSs. In one aspect, the subset of RS configurations may be transmitted based on receiving the indication of the UE capabilities to perform the spur detection based on the plurality of RSs. The subset of RS configurations may include a plurality of DMRS port configurations, and the RS may be the DMRS. The MIMO configuration set including the DMRS port configurations may be modified to include complementary DMRS port configurations in such way that every DMRS port configurations of the MIMO configuration set may provide full coverage for the spur detection. For example, at 606, the UE 602 may transmit, to a base station 604, an indication of a UE capability to perform a spur detection based on a plurality of RSs. Furthermore, 706 may be performed by a spur detection component 1140.

At 708, the UE may transmit, to the base station, an indication of the MCS threshold value or an indication of the at least one parameter of the MCS threshold value. Here, the at least one parameter including one or more of: a UE implementation, a UE class, UE thermal conditions, an RF band, or a combination of bands, where the MCS threshold value is generated based on the at least one parameter. For example, at 608, the UE 602 may transmit, to the base station 604, an indication of the MCS threshold value or an indication of the at least one parameter of the MCS threshold value. Furthermore, 708 may be performed by an MCS component 1142.

At 714, the UE may receive, from the base station, a subset of RS configurations among a set of RS configurations. In one aspect, the plurality of RSs may include a plurality of DMRS. In one aspect, the subset of RS configurations is transmitted via DCI. In one aspect, the additional complementary DMRS port configurations may be associated with reserved bit field values of the DCI. In another aspect, a bit field of the DCI associated with the subset of RS configurations may include an additional bit. That is, in certain aspects, to support the additional complementary DMRS port configurations, the bit field length of the DCI may be increased. In another aspect, the subset of RS configurations may be transmitted and received based on the MCS of the downlink transmission to the UE 602 being greater than or equal to the MCS threshold value. For example, at 614, the UE 602 may receive, from the base station 604, a subset of RS configurations among a set of RS configurations. In one aspect, the plurality of RSs may include a plurality of DMRS. Furthermore, 714 may be performed by an RS component 1144.

At 716, the UE may receive, from the base station, the plurality of RSs based on the subset of RS configurations, the plurality of RSs spanning each of a plurality of REs in an active BWP. Here, to transmit the plurality of RSs to the UE 602, base station 604 may be configured to alternate between each of the plurality of RSs for each allocation for transmitting the plurality of RSs. For example, at 616, the UE 602 may receive, from the base station 604, the plurality of RSs based on the subset of RS configurations, the plurality of RSs spanning each of a plurality of REs in an active BWP. Furthermore, 716 may be performed by the RS component 1144.

At 718, the UE may detect spurs based on the plurality of RSs received based on the subset of RS configurations received from the base station. For example, the UE may apply the HPF on the RS including the descrambled tones of the same type. In one example, the tones may have the same port combination. In another example, the tones may have the same OCC weights combination. Since the plurality of RSs received at 716 may span each of a plurality of REs in an active BWP, the UE may detect the spurs using the RS on each of the plurality or REs in the active BWP. For example, at 618, the UE 602 may detect spurs based on the plurality of RSs received based on the subset of RS configurations received from the base station 604. Furthermore, 718 may be performed by the RS component 1144.

Figure 8:
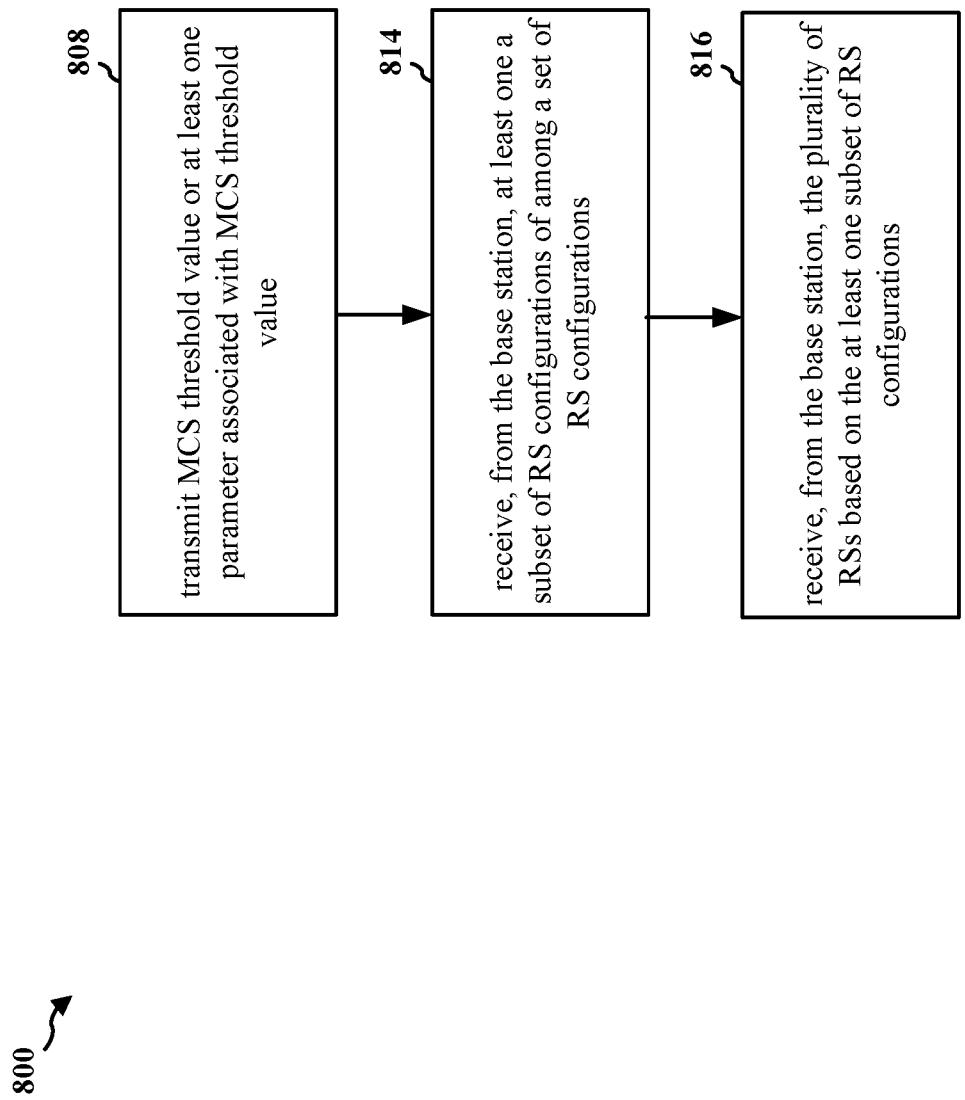
FIG. 8 is a flowchart of a method of wireless communication.

FIG. 8 is a flowchart 800 of a method of wireless communication. The method may be performed by a UE (e.g., the UE 104; the apparatus 1102). The UE may receive a subset of RS configurations among a set of RS configurations, and receive the plurality of RSs based on the subset of RS configurations and perform a spur detection based on the plurality of RSs received based on the subset of RS configurations. The plurality of RSs may be configured to span each of the plurality of REs in the active BWP. Here, each RS configuration of the set of RS configurations may be associated with at least one of the subset of RS configurations, and the at least one of the subset of RS configurations may be associated with a plurality of RSs spanning each of a plurality of REs in an active BWP.

At 808, the UE may transmit, to the base station, an indication of the MCS threshold value or an indication of the at least one parameter of the MCS threshold value. Here, the at least one parameter including one or more of: a UE implementation, a UE class, UE thermal conditions, an RF band, or a combination of bands, where the MCS threshold value is generated based on the at least one parameter. For example, at 608, the UE 602 may transmit, to the base station 604, an indication of the MCS threshold value or an indication of the at least one parameter of the MCS threshold value. Furthermore, 808 may be performed by an MCS component 1142.

At 814, the UE may receive, from the base station, a subset of RS configurations among a set of RS configurations. In one aspect, the plurality of RSs may include a plurality of DMRS. In one aspect, the subset of RS configurations is transmitted via DCI. In one aspect, the additional complementary DMRS port configurations may be associated with reserved field bit values of the DCI. In another aspect, a bit field of the DCI associated with the subset of RS configurations may include an additional bit. That is, in certain aspects, to support the additional complementary DMRS port configurations, the bit field length of the DCI may be increased. In another aspect, the subset of RS configurations may be transmitted and received based on the MCS of the downlink transmission to the UE 602 being greater than or equal to the MCS threshold value. For example, at 614, the UE 602 may receive, from the base station 604, a subset of RS configurations among a set of RS configurations. In one aspect, the plurality of RSs may include a plurality of DMRS. Furthermore, 814 may be performed by an RS component 1144.

At 816, the UE may receive, from the base station, the plurality of RSs based on the subset of RS configurations, the plurality of RSs spanning each of a plurality of REs in an active BWP. Here, to transmit the plurality of RSs to the UE 602, base station 604 may be configured to alternate between each of the plurality of RSs for each allocation for transmitting the plurality of RSs. For example, at 616, the UE 602 may receive, from the base station 604, the plurality of RSs based on the subset of RS configurations, the plurality of RSs spanning each of a plurality of REs in an active BWP. Furthermore, 816 may be performed by the RS component 1144.

Figure 9:
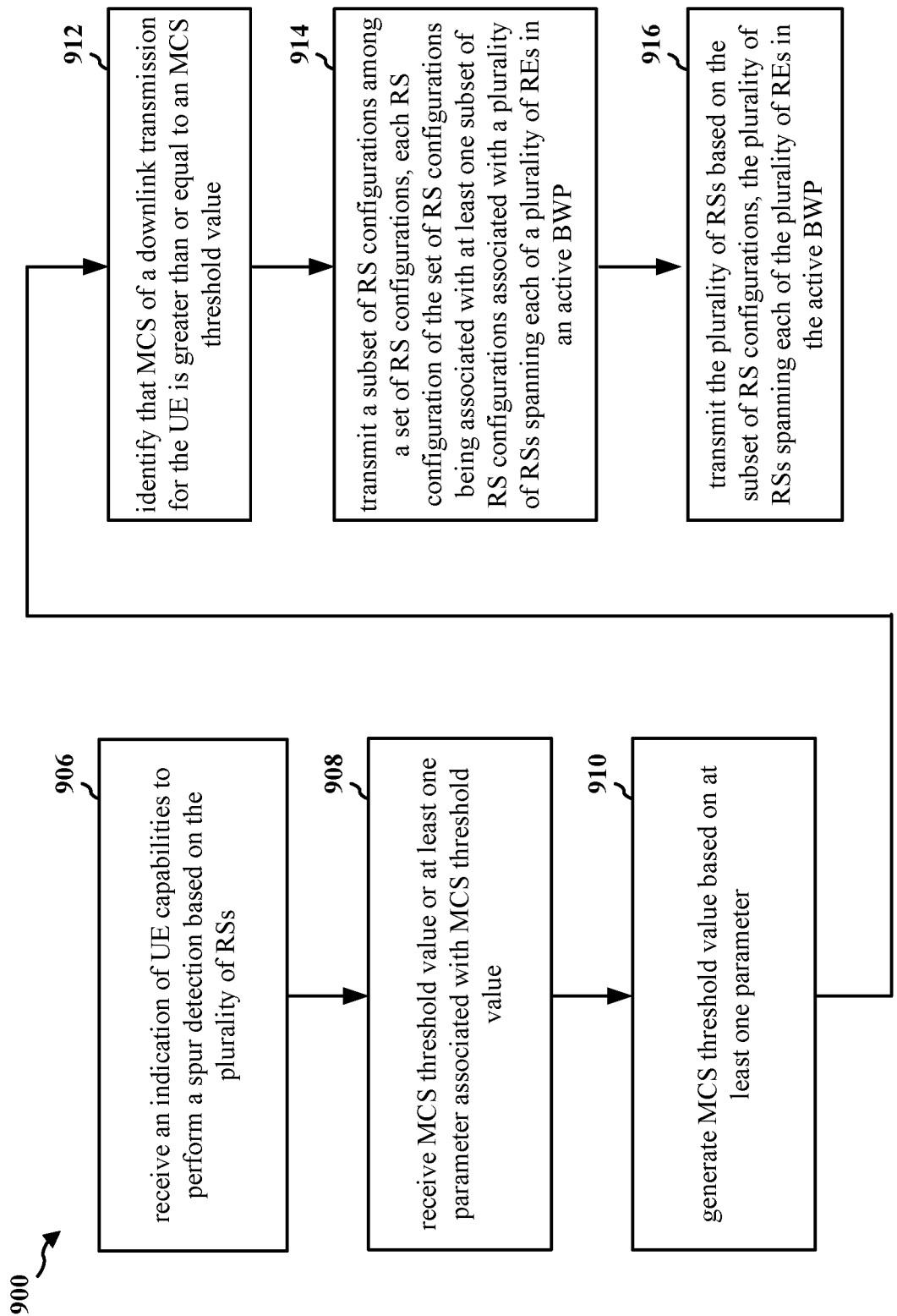
FIG. 9 is a flowchart of a method of wireless communication.

FIG. 9 is a flowchart 900 of a method of wireless communication. The method may be performed by a base station (e.g., the base station 102/180; the apparatus 1202). The base station may configure the UE with a subset of RS configurations among a set of RS configurations, and transmit a plurality of RSs based on the subset of RS configurations. The plurality of RSs may be configured to span each of the plurality of REs in the active BWP. Here, each RS configuration of the set of RS configurations may be associated with at least one of the subset of RS configurations, and the at least one of the subset of RS configurations may be associated with a plurality of RSs spanning each of a plurality of REs in an active BWP.

At 906, the base station may receive, from the UE, an indication of UE capabilities to perform a spur detection based on the plurality of RSs. In one aspect, the subset of RS configurations may be transmitted based on receiving the indication of the UE capabilities to perform the spur detection based on the plurality of RSs. The subset of RS configurations may include a plurality of DMRS port configurations, and the RS may be the DMRS. The MIMO configuration set including the DMRS port configurations may be modified to include complementary DMRS port configurations in such way that every DMRS port configurations of the MIMO configuration set may provide full coverage for the spur detection. For example, at 606, the base station 604 may receive, from the UE 602, an indication of UE capabilities to perform a spur detection based on the plurality of RSs. Furthermore, 906 may be performed by a spur detection component 1240.

At 908, the base station may receive, from the UE, an indication of the MCS threshold value or an indication of the at least one parameter of the MCS threshold value. Here, the at least one parameter including one or more of: a UE implementation, a UE class, UE thermal conditions, an RF band, or a combination of bands, where the MCS threshold value is generated based on the at least one parameter. For example, at 608, the base station 604 may receive, from the UE 602, an indication of the MCS threshold value or an indication of the at least one parameter of the MCS threshold value. Furthermore, 908 may be performed by an MCS component 1242.

At 910, the base station may generate the MCS threshold value based on at least one parameter, the at least one parameter including one of more of: a UE implementation, a UE class, UE thermal conditions, an RF band, or a combination of bands. That is, the base station may generate the MCS threshold value based on the at least one parameter received from the UE at 908. For example, at 610, the base station 604 may generate the MCS threshold value based on at least one parameter, the at least one parameter including one of more of: a UE implementation, a UE class, UE thermal conditions, an RF band, or a combination of bands. Furthermore, 910 may be performed by the MCS component 1242.

At 912, the base station may identify that the MCS of a downlink transmission to the UE is greater than or equal to an MCS threshold value. The MCS threshold value may be received from the UE at 908 or generated at 910. The spur mitigation may be important for higher MCSs and should be employed by the network in case the MCS is greater than or equal to the MCS threshold value. Therefore, the base station 604 may be configured to transmit the subset of RS configurations and the plurality of RSs to the UE 602 based on determining that the MCS of the DL is greater than or equal to the MCS threshold value. For example, at 612, the base station 604 may identify that the MCS of a downlink transmission to the UE 602 is greater than or equal to an MCS threshold value. Furthermore, 912 may be performed by the MCS component 1242.

At 914, the base station may transmit, to the UE, a subset of RS configurations among a set of RS configurations, each RS configuration of the set of RS configurations being associated with at least one of the subset of RS configurations that is associated with a plurality of RSs spanning each of a plurality of REs in an active BWP. In one aspect, the plurality of RSs may include a plurality of DMRS. In one aspect, the subset of RS configurations is transmitted via DCI. In one aspect, the additional complementary DMRS port configurations may be associated with reserved field bit values of the DCI. In another aspect, a bit field of the DCI associated with the subset of RS configurations may include an additional bit. That is, in certain aspects, to support the additional complementary DMRS port configurations, the bit field length of the DCI may be increased. In another aspect, the subset of RS configurations may be transmitted and received based on the MCS of the downlink transmission to the UE being greater than or equal to the MCS threshold value. For example, at 614, the base station 604 may transmit, to the UE 602, a subset of RS configurations among a set of RS configurations, each RS configuration of the set of RS configurations being associated with at least one of the subset of RS configurations that is associated with a plurality of RSs spanning each of a plurality of REs in an active BWP. Furthermore, 914 may be performed by an RS component 1244.

At 916, the base station may transmit, to the UE, the plurality of RSs based on the subset of RS configurations, the plurality of RSs spanning each of the plurality of REs in the active BWP. Here, to transmit the plurality of RSs to the UE 602, base station 604 may be configured to alternate between each of the plurality of RSs for each allocation for transmitting the plurality of RSs. For example, at 616, the base station 604 may transmit, to the UE 602, the plurality of RSs based on the subset of RS configurations, the plurality of RSs spanning each of the plurality of REs in the active BWP. Furthermore, 916 may be performed by the RS component 1244.

Figure 10:
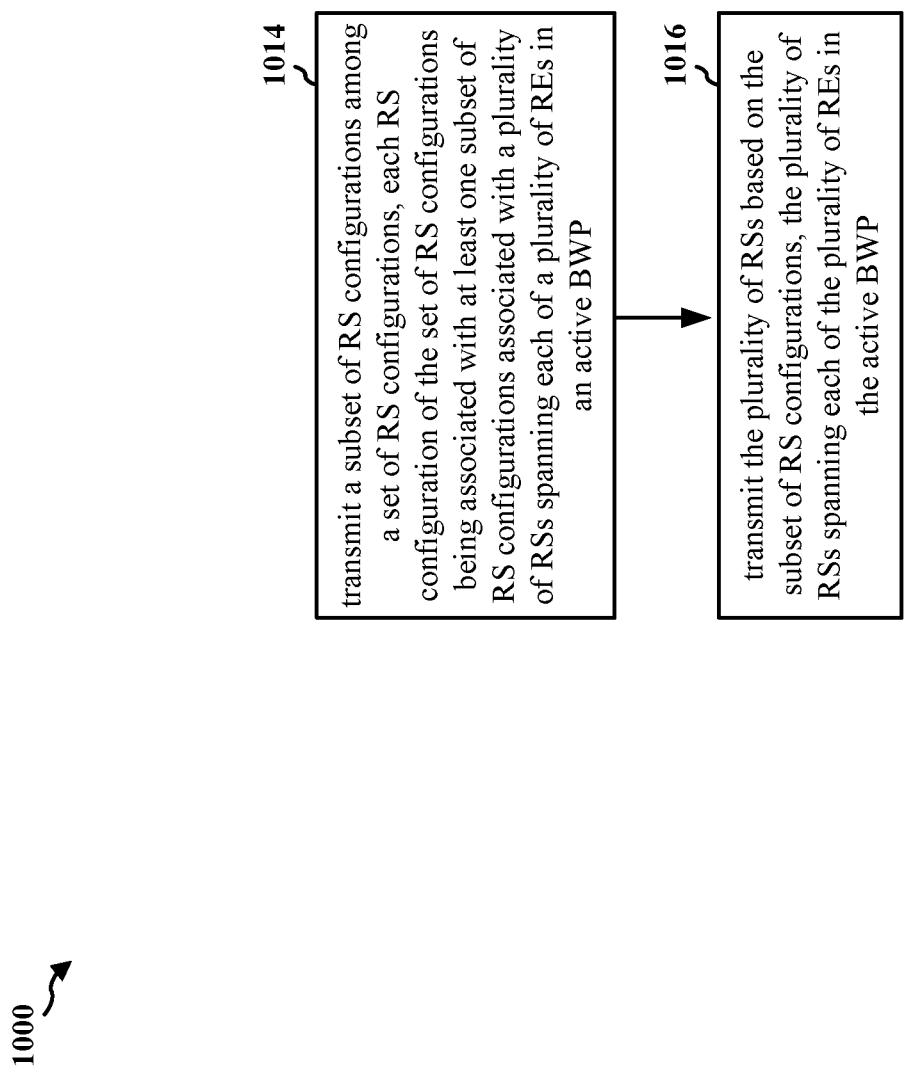
FIG. 10 is a flowchart of a method of wireless communication.

FIG. 10 is a flowchart 1000 of a method of wireless communication. The method may be performed by a base station (e.g., the base station 102/180; the apparatus 1202). The base station may configure the UE with a subset of RS configurations among a set of RS configurations, and transmit a plurality of RSs based on the subset of RS configurations. The plurality of RSs may be configured to span each of the plurality of REs in the active BWP. Here, each RS configuration of the set of RS configurations may be associated with at least one of the subset of RS configurations, and the at least one of the subset of RS configurations may be associated with a plurality of RSs spanning each of a plurality of REs in an active BWP.

At 1014, the base station may transmit, to the UE, a subset of RS configurations among a set of RS configurations, each RS configuration of the set of RS configurations being associated with at least one of the subset of RS configurations that is associated with a plurality of RSs spanning each of a plurality of REs in an active BWP. In one aspect, the plurality of RSs may include a plurality of DMRS. In one aspect, the subset of RS configurations is transmitted via DCI. In one aspect, the additional complementary DMRS port configurations may be associated with reserved field bit values of the DCI. In another aspect, a bit field of the DCI associated with the subset of RS configurations may include an additional bit. That is, in certain aspects, to support the additional complementary DMRS port configurations, the bit field length of the DCI may be increased. In another aspect, the subset of RS configurations may be transmitted and received based on the MCS of the downlink transmission to the UE being greater than or equal to the MCS threshold value. For example, at 614, the base station 604 may transmit, to the UE 602, a subset of RS configurations among a set of RS configurations, each RS configuration of the set of RS configurations being associated with at least one of the subset of RS configurations that is associated with a plurality of RSs spanning each of a plurality of REs in an active BWP. Furthermore, 1014 may be performed by an RS component 1244.

At 1016, the base station may transmit, to the UE, the plurality of RSs based on the subset of RS configurations, the plurality of RSs spanning each of the plurality of REs in the active BWP. Here, to transmit the plurality of RSs to the UE 602, base station 604 may be configured to alternate between each of the plurality of RSs for each allocation for transmitting the plurality of RSs. For example, at 616, the base station 604 may transmit, to the UE 602, the plurality of RSs based on the subset of RS configurations, the plurality of RSs spanning each of the plurality of REs in the active BWP. Furthermore, 1016 may be performed by the RS component 1244.

Figure 11:
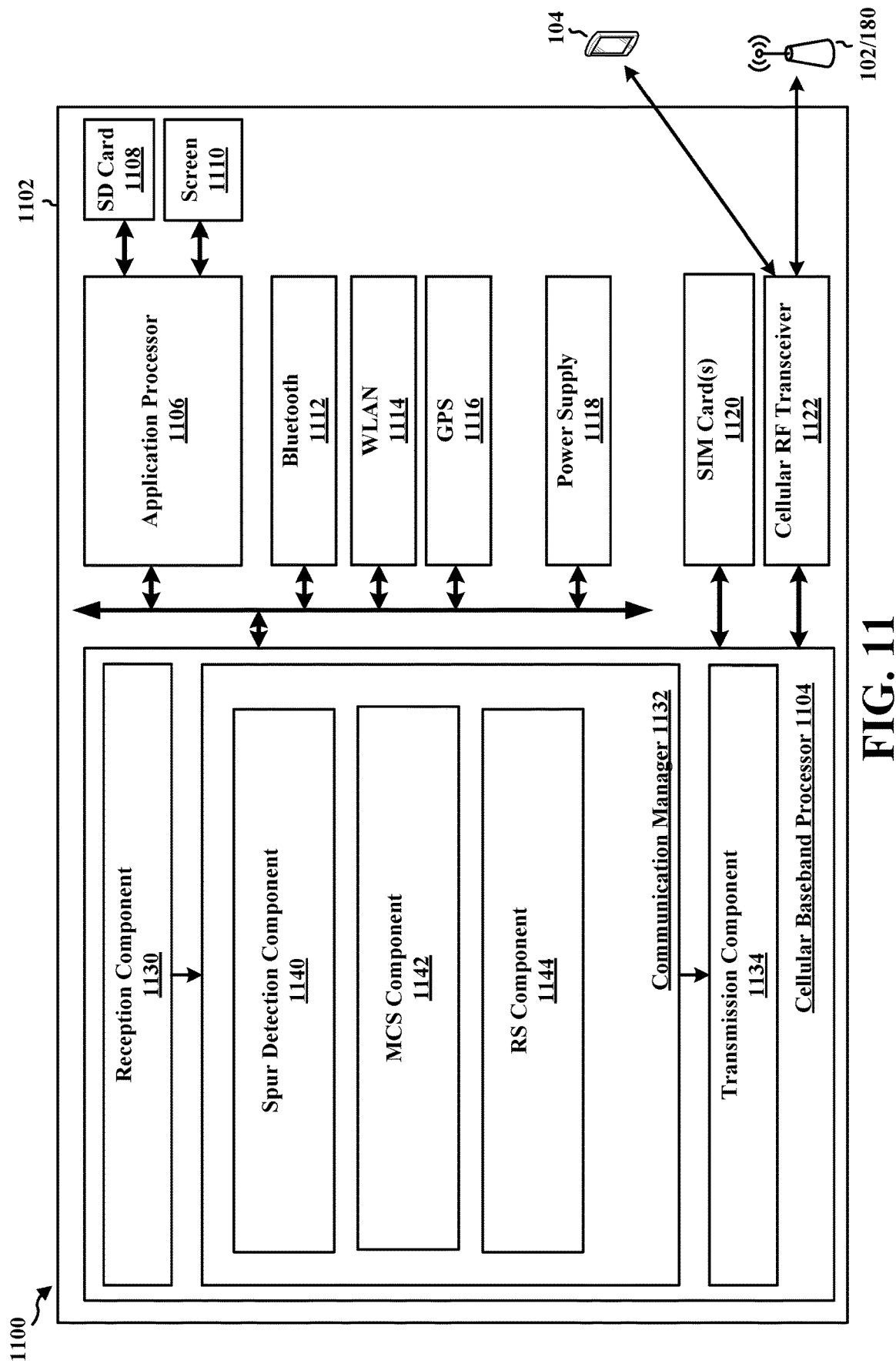
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or BS 102/180. The cellular baseband processor 1104 may include a computer-readable medium/ memory. The computer-readable medium/memory may be non-transitory. The cellular baseband processor 1104 is responsible for general processing, including the execution of software stored on the computer-readable medium/ memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes a spur detection component 1140 that is configured to transmit an indication of a UE capability to perform a spur detection, e.g., as described in connection with 706. The communication manager 1132 further includes an MCS component 1142 that is configured to transmit an indication of the MCS threshold value or an indication of the at least one parameter of the MCS threshold value, e.g., as described in connection with 708 and 808. The communication manager 1132 includes an RS component 1144 that is configured to receive a subset of RS configurations among a set of RS configurations, the plurality of RSs based on the subset of RS configurations, and detect spurs based on the plurality of RSs received based on the subset of RS configurations, e.g., as described in connection with 714, 716, 718, 814, and 816.

The apparatus may include additional components that perform each of the blocks of the algorithm in the flowcharts of FIGS. 6, 7, and 8. As such, each block in the flowcharts of FIGS. 6, 7, and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, includes means for transmitting, to a base station, an indication of a UE capability to perform a spur detection based on a plurality of RSs, means for receiving, from the base station, a subset of RS configurations among a set of RS configurations, means for receiving, from the base station, the plurality of RSs based on the subset of RS configurations, the plurality of RSs spanning each of a plurality of REs in an active BWP, and means for detecting spurs based on the plurality of RSs received based on the subset of RS configurations. The apparatus 1102 means for transmitting, to the base station, an indication of the MCS threshold value or an indication of at least one parameter associated with the MCS threshold value. The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
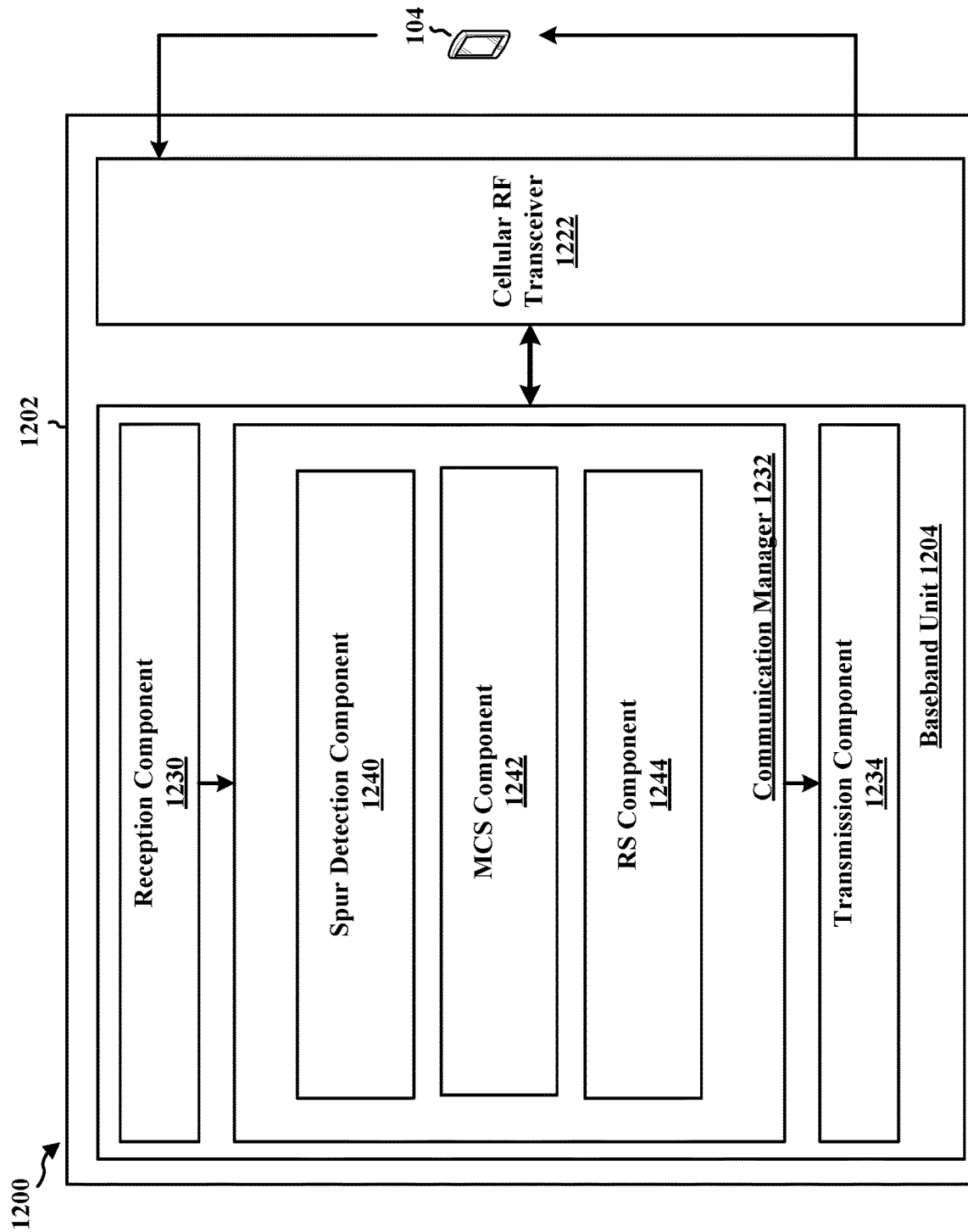
FIG. 12 is a diagram illustrating an example of a hardware implementation for an example apparatus.

FIG. 12 is a diagram 1200 illustrating an example of a hardware implementation for an apparatus 1202. The apparatus 1202 may be a base station, a component of a base station, or may implement base station functionality. In some aspects, the apparatus 1102 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes a spur detection component 1240 that is configured to receive, from the UE, an indication of UE capabilities to perform a spur detection based on the plurality of RSs, e.g., as described in connection with 906. The communication manager 1232 further includes an MCS component 1242 that is configured to receive, from the UE, an indication of the MCS threshold value or an indication of the at least one parameter of the MCS threshold value, generate the MCS threshold value based on at least one parameter, and identify that the MCS of a downlink transmission is greater than or equal to an MCS threshold value, e.g., as described in connection with 908, 910, and 912. The communication manager 1232 includes an RS component 1244 that is configured to transmit, to the UE, a subset of RS configurations among a set of RS configurations and the plurality of RSs, e.g., as described in connection with 914, 916, 1014, and 1016.

The apparatus may include additional components that perform each of the blocks of the algorithm in the flowcharts of FIGS. 6, 9, and 10. As such, each block in the flowcharts of FIGS. 6, 9, and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for transmitting, to a UE, a subset of RS configurations among a set of RS configurations, each RS configuration of the set of RS configurations being associated with at least one of the subset of RS configurations that is associated with a plurality of RSs spanning each of a plurality of REs in an active BWP, means for transmitting, to the UE, the plurality of RSs based on the subset of RS configurations, the plurality of RSs spanning each of the plurality of REs in the active BWP, and means for receiving, from the UE, an indication of UE capabilities to perform a spur detection based on the plurality of RSs. The apparatus 1202 includes means for identifying that an MCS of a downlink transmission to the UE is greater than or equal to an MCS threshold value, means for receiving, from the UE, an indication of the MCS threshold value, means for receiving, from the UE, an indication of the at least one parameter and means for generating the MCS threshold value based on at least one parameter associated with the MCS threshold value. The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

The apparatus may include a base station and a UE. The base station may configure the UE with a subset of RS configurations among a set of RS configurations, and transmit a plurality of RSs based on the subset of RS configurations. The RS may be a DMRS. The plurality of RSs may be configured to span each of the plurality of REs in the active BWP. The UE may receive the plurality of RSs based on the subset of RS configurations and perform a spur detection based on the plurality of RSs received based on the subset of RS configurations. Each RS configuration of the set of RS configurations may be associated with at least one of the subset of RS configurations, and the at least one of the subset of RS configurations may be associated with the plurality of RSs spanning each of the plurality of REs in the active BWP.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a network node including at least one processor coupled to a memory and configured to transmit, for a UE, a subset of RS configurations among a set of RS configurations, each RS configuration of the set of RS configurations being associated with at least one of the subset of RS configurations that is associated with a plurality of RSs spanning each of a plurality of REs in an active BWP, and transmit, for the UE, the plurality of RSs based on the subset of RS configurations, the plurality of RSs spanning each of the plurality of REs in the active BWP.

Aspect 2 is the apparatus of aspect 1, where the at least one processor is further configured to receive an indication of UE capabilities to perform a spur detection based on the plurality of RSs, where the subset of RS configurations is transmitted based on receiving the indication of the UE capabilities to perform the spur detection based on the plurality of RSs.

Aspect 3 is the apparatus of any of aspects 1 and 2, where the plurality of RSs includes a plurality of DMRSs, and the subset of RS configurations includes a plurality of DMRS port configurations.

Aspect 4 is the apparatus of any of aspects 1 to 3, further including a transceiver coupled to the at least one processor, where the subset of RS configurations is transmitted via DCI.

Aspect 5 is the apparatus of any of aspect 4, where a bit field of the DCI associated with the subset of RS configurations may include at least one first bit and an additional bit corresponding to the subset of RS configurations.

Aspect 6 is the apparatus of any of aspects 1 to 5, where, to transmit the plurality of RSs, the at least one processor is configured to alternate between each of the plurality of RSs for each allocation for transmitting the plurality of RSs.

Aspect 7 is the apparatus of any of aspects 1 to 6, where the at least one processor is further configured to identify that a modulation and coding scheme (MCS) of a downlink transmission for the UE is greater than or equal to an MCS threshold value, and the subset of RS configurations is transmitted based on the MCS of the downlink transmission for the UE being greater than or equal to the MCS threshold value.

Aspect 8 is the apparatus of any of aspect 7, where the at least one processor is further configured to generate the MCS threshold value based on at least one parameter, the at least one parameter including one of more of a UE implementation, a UE class, UE thermal conditions, an RF band, or a combination of bands.

Aspect 9 is the apparatus of any of aspect 8, where the at least one processor is further configured to receive an indication of the at least one parameter.

Aspect 10 is the apparatus of any of aspect 7, where the at least one processor is further configured to receive an indication of the MCS threshold value.

Aspect 11 is a method of wireless communication for implementing any of aspects 1 to 10.

Aspect 12 is an apparatus for wireless communication including means for implementing any of aspects 1 to 10.

Aspect 13 is a computer-readable medium storing computer executable code, where the code when executed by a processor causes the processor to implement any of aspects 1 to 10.

Aspect 14 is an apparatus for wireless communication at a UE including at least one processor coupled to a memory and configured to transmit, to a base station, an indication of a UE capability to perform a spur detection based on a plurality of RSs, receive, from the base station, a subset of RS configurations among a set of RS configurations, and receive, from the base station, the plurality of RSs based on the subset of RS configurations, the plurality of RSs spanning each of a plurality of REs in an active BWP.

Aspect 15 is the apparatus of aspect 14, where each RS configuration of the set of RS configurations is associated with at least one of the subset of RS configurations that is associated with the plurality of RSs spanning each of the plurality of REs in the active BWP.

Aspect 16 is the apparatus of any of aspects 14 and 15, where the plurality of RSs includes a plurality of demodulation RSs (DMRSs), and the subset of RS configuration includes a plurality of DMRS port configurations.

Aspect 17 is the apparatus of any of aspects 14 to 16, further including a transceiver coupled to the at least one processor, where the subset of RS configurations is transmitted via downlink control information (DCI).

Aspect 18 is the apparatus of any of aspect 17, where a bit field of the DCI associated with the subset of RS configurations may include at least one first bit and an additional bit corresponding to the subset of RS configurations.

Aspect 19 is the apparatus of any of aspects 14 to 18, where, to receive the plurality of RSs, the at least one processor is configured to alternate between each of the plurality of RSs for each allocation for transmitting the plurality of RSs.

Aspect 20 is the apparatus of any of aspects 14 to 19, where the subset of RS configurations is received based on a MCS of a downlink transmission from the base station being greater than an MCS threshold value.

Aspect 21 is the apparatus of any of aspect 20, where the at least one processor is further configured to transmit, to the base station, an indication of at least one parameter, the at least one parameter including one or more of a UE implementation, a UE class, UE thermal conditions, an RF band, or a combination of bands, where the MCS threshold value is generated based on the at least one parameter.

Aspect 22 is the apparatus of any of aspects 14 to 16, where the at least one processor is further configured to transmit, to the base station, an indication of the MCS threshold value.

Aspect 23 is the apparatus of any of aspects 14 to 16, where the at least one processor is further configured to detect spurs based on the plurality of RSs received based on the subset of RS configurations.

Aspect 24 is a method of wireless communication for implementing any of aspects 14 to 23.

Aspect 25 is an apparatus for wireless communication including means for implementing any of aspects 14 to 23.

Aspect 26 is a computer-readable medium storing computer executable code, where the code when executed by a processor causes the processor to implement any of aspects 14 to 23.

What is claimed is:

1. An apparatus for wireless communication at a network node, comprising:
 a memory; and
 at least one processor coupled to the memory and configured to:
  receive, from a user equipment (UE), an indication of UE capabilities to perform a spur detection based on a plurality of reference signals (RSs) spanning each of a plurality of resource elements (REs) in an active bandwidth part (BWP);
  transmit, for the user equipment (UE) and based on receiving the indication of the UE capabilities to perform the spur detection based on the plurality of RSs, a subset of reference signal (RS) configurations among a set of RS configurations, each RS configuration of the set of RS configurations being associated with at least one of the subset of RS configurations that is associated with the plurality of RSs spanning each of the plurality of resource elements (REs) in the active bandwidth part (BWP); and
  transmit the plurality of RSs based on the subset of RS configurations, the plurality of RSs spanning each of the plurality of REs in the active BWP.

2. The apparatus of claim 1, wherein the plurality of RSs includes a plurality of demodulation RSs (DMRSs), and the subset of RS configurations includes a plurality of DMRS port configurations.

3. The apparatus of claim 1, further comprising a transceiver coupled to the at least one processor, wherein the subset of RS configurations is transmitted via downlink control information (DCI).

4. The apparatus of claim 3, wherein a bit field of the DCI associated with the subset of RS configurations includes at least one first bit and an additional bit corresponding to the subset of RS configurations.

5. The apparatus of claim 1, wherein, to transmit the plurality of RSs, the at least one processor is configured to alternate between each of the plurality of RSs for each allocation for transmitting the plurality of RSs.

6. The apparatus of claim 1, wherein the at least one processor is further configured to identify that a modulation and coding scheme (MCS) of a downlink transmission for the UE is greater than or equal to an MCS threshold value,
 wherein the subset of RS configurations is transmitted based on the MCS of the downlink transmission for the UE being greater than or equal to the MCS threshold value.

7. The apparatus of claim 6, wherein the at least one processor is further configured to generate the MCS threshold value based on at least one parameter, the at least one parameter including one of more of: a UE implementation, a UE class, UE thermal conditions, a radio frequency (RF) band, or a combination of bands.

8. The apparatus of claim 7, wherein the at least one processor is further configured to receive an indication of the at least one parameter.

9. The apparatus of claim 6, wherein the at least one processor is further configured to receive an indication of the MCS threshold value.

10. An apparatus for wireless communication at a user equipment (UE), comprising:
a memory; and
at least one processor coupled to the memory and configured to:
transmit, to a base station, an indication of a UE capability to perform a spur detection based on a plurality of reference signals (RSs);
receive, from the base station, a subset of RS configurations among a set of RS configurations; and
receive, from the base station, the plurality of RSs based on the subset of RS configurations, the plurality of RSs spanning each of a plurality of resource elements (REs) in an active bandwidth part (BWP).

11. The apparatus of claim 10, wherein each RS configuration of the set of RS configurations is associated with at least one of the subset of RS configurations that is associated with the plurality of RSs spanning each of the plurality of REs in the active BWP.

12. The apparatus of claim 10, wherein the plurality of RSs includes a plurality of demodulation RSs (DMRSs), and the subset of RS configuration includes a plurality of DMRS port configurations.

13. The apparatus of claim 10, further comprising a transceiver coupled to the at least one processor, wherein the subset of RS configurations is received via downlink control information (DCI).

14. The apparatus of claim 13, wherein a bit field of the DCI associated with the subset of RS configurations includes at least one first bit and an additional bit corresponding to the subset of RS configurations.

15. The apparatus of claim 10, wherein, to receive the plurality of RSs, the at least one processor is configured to alternate between each of the plurality of RSs for each allocation for transmitting the plurality of RSs.

16. The apparatus of claim 10, wherein the subset of RS configurations is received based on a modulation and coding scheme (MCS) of a downlink transmission from the base station being greater than an MCS threshold value.

17. The apparatus of claim 16, wherein the at least one processor is further configured to transmit, to the base station, an indication of at least one parameter, the at least one parameter including one or more of: a UE implementation, a UE class, UE thermal conditions, a radio frequency (RF) band, or a combination of bands, wherein the MCS threshold value is generated based on the at least one parameter.

18. The apparatus of claim 16, wherein the at least one processor is further configured to transmit, to the base station, an indication of the MCS threshold value.

19. The apparatus of claim 10, wherein the at least one processor is further configured to detect spurs based on the plurality of RSs received based on the subset of RS configurations.

20. A method of wireless communication at a network node, comprising:
receiving, from a user equipment (UE), an indication of UE capabilities to perform a spur detection based on a plurality of reference signals (RSs) spanning each of a plurality of resource elements (REs) in an active bandwidth part (BWP);
transmitting, for the user equipment (UE) and based on receiving the indication of the UE capabilities to perform the spur detection based on the plurality of RSs, a subset of reference signal (RS) configurations among a set of RS configurations, each RS configuration of the set of RS configurations being associated with at least one of the subset of RS configurations that is associated with the plurality of RSs spanning each of the plurality of resource elements (REs) in the active bandwidth part (BWP); and
transmitting, for the UE, the plurality of RSs based on the subset of RS configurations, the plurality of RSs spanning each of the plurality of REs in the active BWP.

21. The method of claim 20, wherein the plurality of RSs includes a plurality of demodulation RSs (DMRSs), and the subset of RS configurations includes a plurality of DMRS port configurations.

22. The method of claim 20, wherein transmitting the plurality of RSs further comprises alternating between each of the plurality of RSs for each allocation for transmitting the plurality of RSs.

23. The method of claim 20, further comprising: identifying that MCS of a downlink transmission is greater than a MCS threshold value.

24. A method of wireless communication at a user equipment (UE), comprising:
transmitting, to a base station, an indication of a UE capability to perform a spur detection based on a plurality of reference signals (RSs);
receiving, from the base station, a subset of RS configurations among a set of RS configurations; and
receiving, from the base station, the plurality of RSs based on the subset of RS configurations, the plurality of RSs spanning each of a plurality of resource elements (REs) in an active bandwidth part (BWP).

25. The method of claim 24, wherein receiving the plurality of RSs comprises alternating between each of the plurality of RSs for each allocation for transmitting the plurality of RSs.

26. The method of claim 24, further comprising transmitting, to the base station, an indication of at least one parameter, the at least one parameter including one or more of: a UE implementation, a UE class, UE thermal conditions, a radio frequency (RF) band, or a combination of bands, wherein a modulation and coding scheme (MCS) threshold value is generated based on the at least one parameter,
wherein the subset of RS configurations is received based on a MCS of a downlink transmission from the base station being greater than an MCS threshold value.

27. The method of claim 24, further comprising transmitting, to the base station, an indication of a modulation and coding scheme (MCS) threshold value,
wherein the subset of RS configurations is received based on a MCS of a downlink transmission from the base station being greater than an MCS threshold value.

28. The method of claim 24, further comprising detecting spurs based on the plurality of RSs received based on the subset of RS configurations.

* * * * *